(12) United States Patent
Chakrabarti

(10) Patent No.: US 8,431,214 B2
(45) Date of Patent: *Apr. 30, 2013

(54) COMPOSITE STRUCTURE HAVING REINFORCED CORE AND METHOD OF MAKING SAME

(75) Inventor: Buddhadev Chakrabarti, Walnut, CA (US)

(73) Assignee: The Boeing Company, Chicago, IL (US)

(*) Notice: Subject to any disclaimer, the term of this patent is extended or adjusted under 35 U.S.C. 154(b) by 228 days.

This patent is subject to a terminal disclaimer.

(21) Appl. No.: 12/705,675

(22) Filed: Feb. 15, 2010

(65) Prior Publication Data

US 2010/0151189 A1   Jun. 17, 2010

Related U.S. Application Data

(63) Continuation-in-part of application No. 11/831,066, filed on Jul. 31, 2007.

(51) Int. Cl.
*B32B 7/08* (2006.01)

(52) U.S. Cl.
USPC .......................................... 428/223; 52/790.1

(58) Field of Classification Search .............. 52/309.1, 52/309.2, 309.14, 790.1, 630; 244/119, 120, 244/123.4, 123.5, 123.6, 131; 428/223
See application file for complete search history.

(56) References Cited

U.S. PATENT DOCUMENTS

| | | | |
|---|---|---|---|
| 3,579,411 A | 5/1971 | Mackie et al. | |
| 4,103,470 A | 8/1978 | Cook | |
| 4,151,031 A | 4/1979 | Goad et al. | |
| 4,361,613 A | 11/1982 | Bogner et al. | |
| 4,556,591 A | 12/1985 | Bannink, Jr. | |
| 4,556,592 A | 12/1985 | Bannink, Jr. | |
| 4,614,013 A | 9/1986 | Stevenson | |
| 4,664,731 A | 5/1987 | Layden et al. | |
| 4,709,714 A | 12/1987 | Nishino et al. | |
| 4,786,343 A | 11/1988 | Hertzberg | |
| 4,808,461 A | 2/1989 | Boyce et al. | |
| 4,822,660 A | 4/1989 | Lipp | |
| 5,102,723 A * | 4/1992 | Pepin | 428/223 |
| 5,177,039 A | 1/1993 | Allaire et al. | |
| 5,225,015 A | 7/1993 | Allaire et al. | |

(Continued)

FOREIGN PATENT DOCUMENTS

| | | |
|---|---|---|
| DE | 10 2006 056568 | 5/2008 |
| EP | 2017073 A2 | 1/2009 |
| EP | 2025504 A1 | 2/2009 |
| JP | 2009023348 A | 2/2009 |

OTHER PUBLICATIONS

Office Action, dated Sep. 5, 2012, regarding U.S. Appl. No. 11/831,066, 18 pages.

(Continued)

*Primary Examiner* — Brian Glessner
*Assistant Examiner* — James Buckle, Jr.
(74) *Attorney, Agent, or Firm* — Yee & Associates, P.C.

(57) ABSTRACT

A polymer-based composite sandwich includes a reinforced core bonded between a pair of composite facesheets. The core includes a truss formed by groups of composite pins held in place by a layer of structural foam. The pins in the groups are radially arranged around nodes. The ends of the pins are splayed and sandwiched between the foam layer and the facesheets.

21 Claims, 16 Drawing Sheets

U.S. PATENT DOCUMENTS

| Patent No. | Date | Inventor | Ref. |
|---|---|---|---|
| 5,506,018 A | 4/1996 | Jacob et al. | |
| 5,589,015 A | 12/1996 | Fusco et al. | |
| 5,632,834 A | 5/1997 | Ostertag et al. | |
| 5,650,229 A | 7/1997 | Gross et al. | |
| 5,667,859 A | 9/1997 | Boyce et al. | |
| 5,789,061 A | 8/1998 | Campbell et al. | |
| 5,827,383 A | 10/1998 | Campbell et al. | |
| 5,869,165 A | 2/1999 | Rorabaugh et al. | |
| 5,876,652 A * | 3/1999 | Rorabaugh et al. | 264/258 |
| 5,958,550 A | 9/1999 | Childress | |
| 6,291,049 B1 | 9/2001 | Kunkel et al. | |
| 6,511,727 B1 | 1/2003 | Bleibler et al. | |
| 6,645,333 B2 | 11/2003 | Johnson et al. | |
| 6,676,785 B2 | 1/2004 | Johnson et al. | |
| 6,716,782 B2 | 4/2004 | Heng et al. | |
| 6,740,381 B2 | 5/2004 | Day et al. | |
| 6,746,755 B2 | 6/2004 | Morrison et al. | |
| 6,830,286 B2 | 12/2004 | Bechtold et al. | |
| 6,969,546 B2 | 11/2005 | DiChiara, Jr. | |
| 7,056,576 B2 | 6/2006 | Johnson | |
| 7,105,071 B2 | 9/2006 | Johnson et al. | |
| 7,200,912 B2 | 4/2007 | Bouillon et al. | |
| 7,217,453 B2 | 5/2007 | Johnson et al. | |
| 7,312,274 B2 | 12/2007 | Millard et al. | |
| 7,424,967 B2 | 9/2008 | Ervin et al. | |
| 7,731,046 B2 | 6/2010 | Johnson | |
| 7,758,715 B2 | 7/2010 | Petersson et al. | |
| 7,785,693 B2 | 8/2010 | Johnson et al. | |
| 7,846,528 B2 | 12/2010 | Johnson et al. | |
| 7,891,096 B2 | 2/2011 | Weber et al. | |
| 7,972,430 B2 | 7/2011 | Millard et al. | |
| 8,034,428 B2 | 10/2011 | Verhaeghe | |
| 8,038,894 B2 | 10/2011 | Brooks | |
| 8,097,106 B2 | 1/2012 | Hand et al. | |
| 8,127,450 B2 | 3/2012 | Weber et al. | |
| 2001/0031350 A1 * | 10/2001 | Day et al. | 428/317.9 |
| 2002/0007607 A1 * | 1/2002 | Matlack et al. | 52/403.1 |
| 2002/0053176 A1 * | 5/2002 | Colson et al. | 52/506.06 |
| 2002/0144767 A1 | 10/2002 | Johnson et al. | |
| 2003/0059577 A1 | 3/2003 | Morrison et al. | |
| 2005/0025948 A1 | 2/2005 | Johnson et al. | |
| 2005/0112321 A1 | 5/2005 | Millard et al. | |
| 2006/0163319 A1 | 7/2006 | Ervin et al. | |
| 2007/0193146 A1 * | 8/2007 | Carstensen et al. | 52/268 |
| 2009/0005232 A1 | 1/2009 | Hand et al. | |
| 2009/0019685 A1 | 1/2009 | Keith et al. | |
| 2009/0035510 A1 | 2/2009 | Chakrabarti | |
| 2009/0320292 A1 | 12/2009 | Brennan et al. | |
| 2010/0102172 A1 | 4/2010 | Bardwell | |
| 2011/0097554 A1 | 4/2011 | Kehrl et al. | |

OTHER PUBLICATIONS

Final Office Action, dated Sep. 5, 2012, regarding U.S. Appl. No. 11/779,439, 13 pages.
Amendment Pursuant to Request for Continued Examination, dated Jul. 2, 2012, regarding U.S. Appl. No. 11/831,066, 14 pages.
European Search Report, dated Dec. 5, 2011, regarding Application No. EP08252351 (EP2017073), 8 pages.
USPTO Office Action dated Nov. 23, 2011, regarding U.S. Appl. No. 11/831,066, 13 pages.
Response to Office Action dated Feb. 23, 2012, regarding U.S. Appl. No. 11/831,066, 12 pages.
USPTO Final Office Action dated Mar. 30, 2012, regarding U.S. Appl. No. 11/831,066, 12 pages.
USPTO Office Action, dated Jul. 20, 2011, regarding U.S. Appl. No. 11/779,439, 11 pages.
USPTO Office Action, dated Apr. 4, 2012, regarding U.S. Appl. No. 11/779,439, 8 pages.
EP 08161510.6-2124 European Search Report.

* cited by examiner

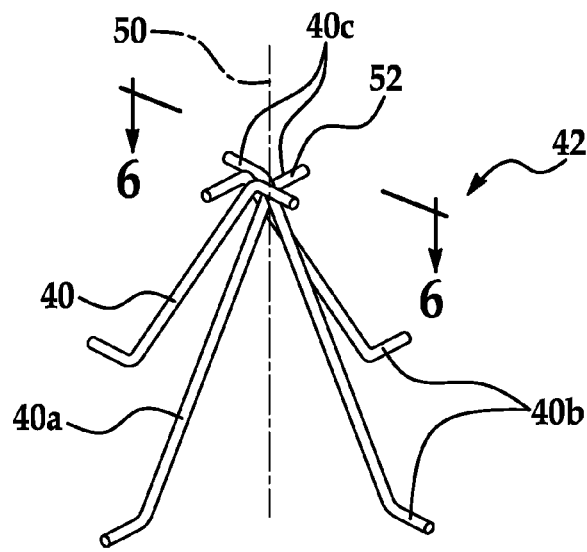
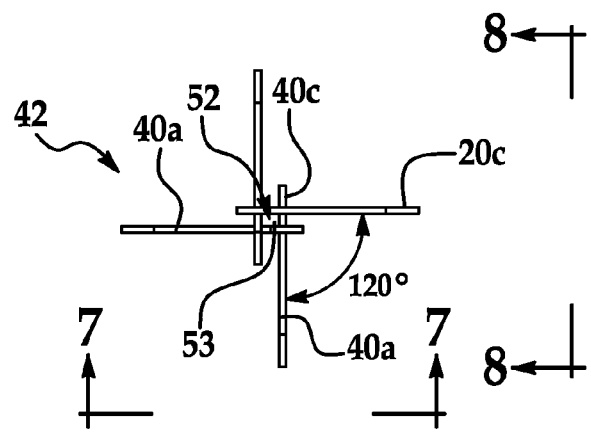
FIG. 5  FIG. 6
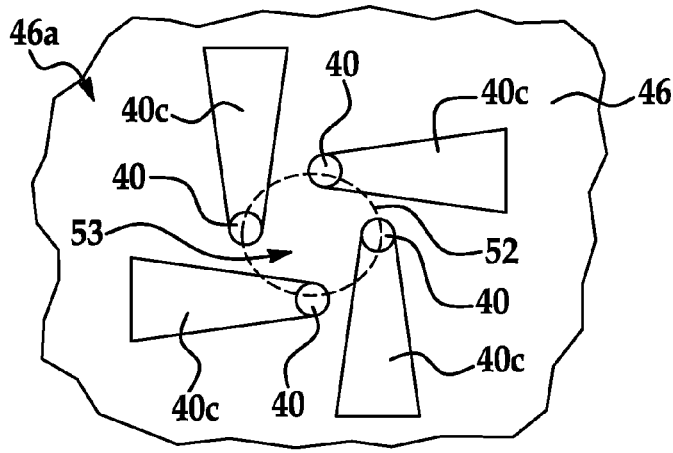
FIG. 6A
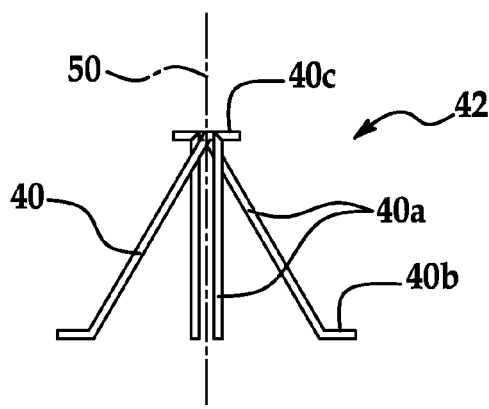 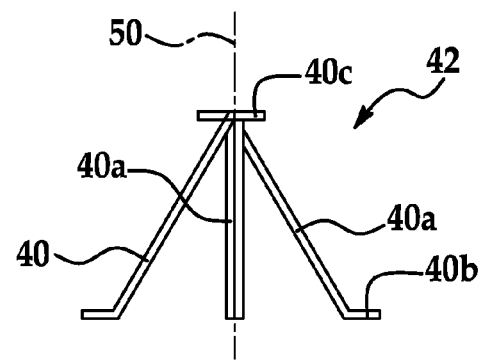
FIG. 7  FIG. 8

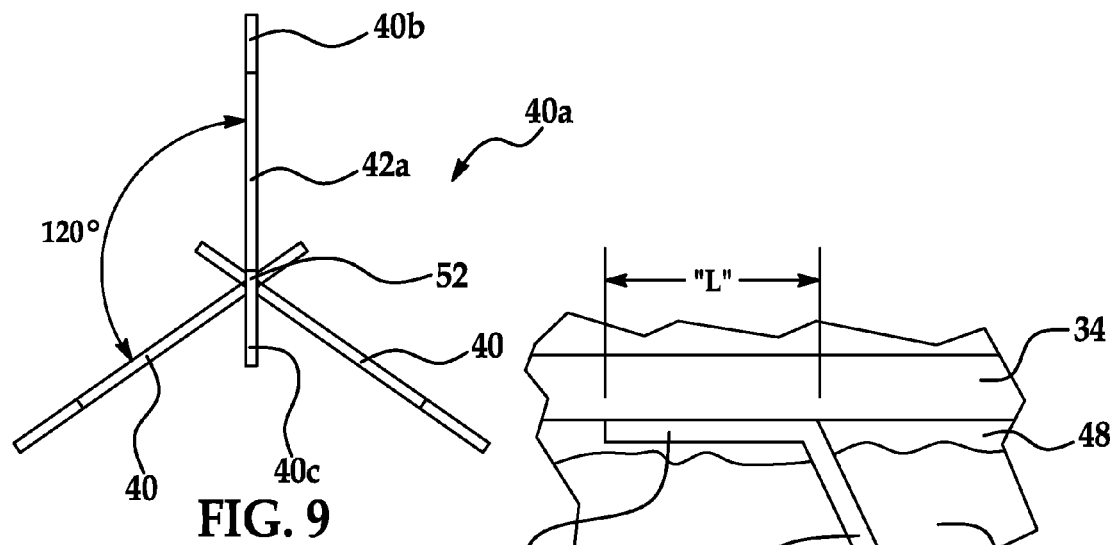
FIG. 9
FIG. 10
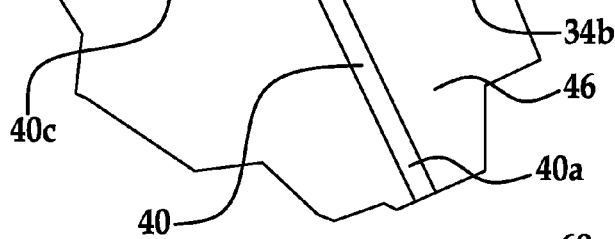
FIG. 11
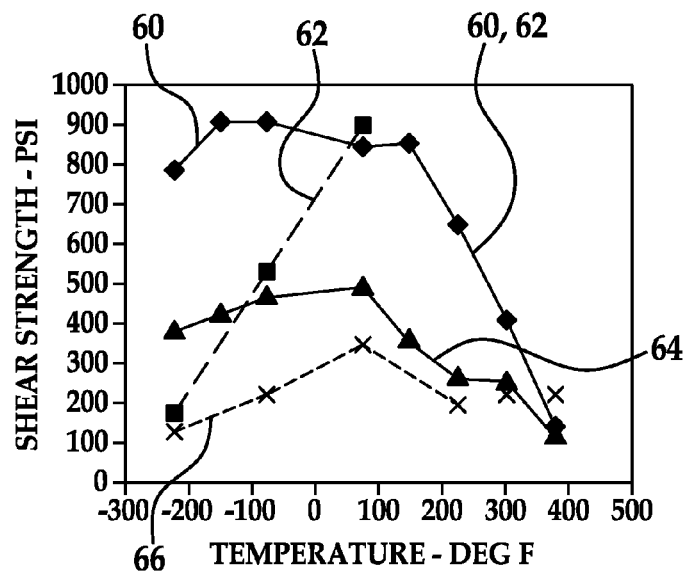
FIG. 12

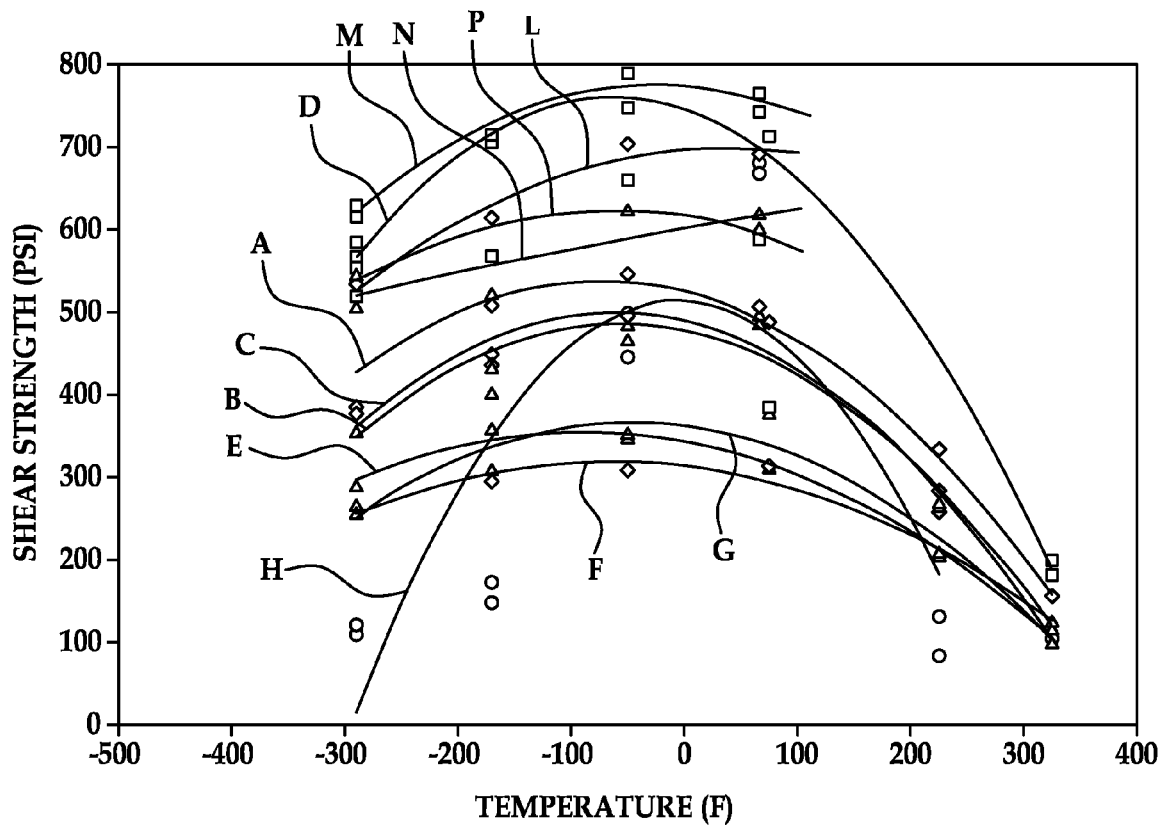

FIG. 13

A. 12.08 pcf, 0.50" 51WF, 0.020" dia, 35deg angle, 8.88 density, 0.080 rev high
B. 9.02 pcf, 0.50" 51WF, 0.020" dia, 35deg angle, 5.82 density, 0.080 rev high
C. 11.94 pcf, 0.50" 51IG, 0.020" dia, 20deg angle, 8.74 density, 0.080 rev high
D. 12.00 pcf, 0.50" 51IG, 0.028" dia, 35deg angle, 8.80 density, 0.080 rev high
E. 12.08 pcf, 0.50" 31IG, 0.020" dia, 35deg angle, 5.30 density, 0.080 rev high
F. 6.89 pcf, 0.50" 31IG, 0.020" dia, 35deg angle, 4.89 density, 0.080 rev high
G. 6.90 pcf, 0.50" 51IG, 0.020" dia, 35deg angle, 3.7 density, 0.080 rev high
H. 0.50" 200WF
J. 0.50" 110WF
L. 12.01 pcf, 0.50" 51IG, 0.020" dia, 30deg angle, 8.81 density, 0.055 rev high
M. 12.01 pcf, 0.50" 51WF, 0.020" dia, 30deg angle, 8.81 density, 0.055 rev high
N. 12.01 pcf, 0.50" 51WF, 0.020" dia, 30deg angle, 8.81 density, 0.080 rev high
P. 11.34 pcf, 0.50" 51WF, 0.020" dia, 30deg angle, 8.14 density, 0.055 rev high

FIG. 14

| CORE DENSITY LBS/CFT 68 | THICKNESS (INCHES) 70 | PIN DIAMETER (INCHES) +/- 0.0015" 72 | PIN ANGLE (FROM VERTICAL) 74 | PIN SPACING (SQUARE PITCH) 76 | REVEAL HEIGHT (INCHES) 78 | PINS PER NODE 80 | BASE FOAM ROHACELL 82 |
|---|---|---|---|---|---|---|---|
| 6.9 | ½ | 0.02 | 30° | 0.191" | 0.055 | 4 | 51WF |
| 6.9 | ¾ | 0.02 | 30° | 0.187" | 0.055 | 4 | 51WF |
| 6.9 | 1 | 0.02 | 30° | 0.185 | 0.055 | 4 | 51WF |
| 12 | ½ | 0.028 | 30° | 0.173 | 0.055 | 4 | 51WF |
| 12 | ¾ | 0.028 | 30° | 0.170 | 0.055 | 4 | 51WF |
| 12 | 1 | 0.028 | 30° | 0.168 | 0.055 | 4 | 51WF |

COMPOSITE STRUCTURE HAVING REINFORCED CORE AND METHOD OF MAKING SAME

CROSS REFERENCE TO RELATED APPLICATIONS

This application is a continuation-in-part of co-pending U.S. patent application Ser. No. 11/831,066 filed Jul. 31, 2007, the entire disclosure of which is incorporated by reference herein.

TECHNICAL FIELD

This disclosure generally relates to composite structures, and deals more particularly with a composite sandwich having a reinforced core, and a method of making the composite sandwich.

BACKGROUND

Composite sandwich constructions may be strengthened by placing structural reinforcement inside a core that is bonded between two facesheets. The core reinforcement may include structural elements that define load paths for transferring compressive, tensile and shear loads between the facesheets. The performance of the composite sandwich is dependent in part upon the type of core reinforcement and the quality of the bonds between the core and the facesheets. Common materials used in the core may include rigid plastic foam and honeycomb. While honeycomb cores exhibit good structural efficiency, they may subjected to higher core-to-facesheet loading in some applications, such as long duration space flights where a differential pressure may develop between the core and the surrounding environment.

Unreinforced closed cell rigid foam cores may exhibit reduced structural efficiency when subjected to moisture and to higher temperatures, or extreme low temperatures in space.

The problems associated with the sandwich constructions discussed above have been partially solved by the introduction of so-called X-COR structural cores which comprise a light-weight, closed cell polymethacrylimide (PMI) foam reinforced with small diameter, pultruded carbon fiber/epoxy pins arranged in a tetragonal truss network. The X-COR pins extend beyond the foam core and are embedded in the facesheets. A variation of X-COR is disclosed in U.S. Pat. No. 6,291,049 issued Sep. 18, 2001, in which the ends of the pins are bent so as to lie flat against facesheets to which the core is bonded.

The truss networks mentioned above that employ carbon fiber/epoxy pins may not provide adequate performance in some aerospace applications. Accordingly, there is a need for a composite structure having a reinforced core that is suitable for demanding aerospace, automotive and marine applications in which superior bond strength between the facesheets and core is required. Embodiments of the disclosure are intended to satisfy this need.

SUMMARY

Embodiments of the disclosure provide a composite sandwich construction in which improved facesheet-to-core bond strength is achieved while assuring that the structural integrity of the core is maintained. The construction and material selection used in the disclosed sandwich construction renders it suitable for high performance applications in the aerospace, automotive and marine industries. For example, and without limitation, the disclosed composite sandwich may be used in long duration spacecraft missions in which differential pressures may arise between the core and the surrounding environment. The improved bond strength provided by the disclosed embodiments may be maintained over a wide range of temperature and moisture conditions.

According to one disclosed embodiment, a composite sandwich comprises a reinforced core sandwiched between first and second composite facesheets. The reinforced core comprises a plurality of pins arranged in groups forming a truss, and a carrier surrounding the pins. Each of the pins includes medial portions extending between the first and second facesheets and distal portions respectively extending generally parallel with and bonded to the first and second facesheets. The pins in each of the groups may be spaced from each other and distributed around a node wherein the distal portions of the pins in each of the groups radiate outwardly from the node. The nodes of the pin groups may be spaced substantially equidistant from each other. The distal portions of each of the pins are splayed and sandwiched between the core and one of the facesheets. The pins may comprise carbon fiber reinforced resin and each of the facesheets may include laminated plies of carbon fiber reinforced resin. The carrier may comprise rigid foam such as a closed cell foam.

According to another disclosed embodiment, a reinforced composite sandwich core is provided that is formable into a curved shape. The core includes a plurality of pins arranged in groups forming a truss and a flexible carrier for supporting the pins. The pins in each of the groups are spaced apart from and displaceable relative to each other within the carrier upon forming of the carrier into the curve shape. The pins in each group are radially distributed around a node. Distal portions of each of the pins are splayed and lay substantially flush along a face of the foam layer.

According to a further embodiment, a method is provided of fabricating a reinforced composite sandwich. The method includes fabricating a core, forming the core into a curved shape, applying a pair of facesheets respectively to opposite faces of the core and curing the core and the facesheets. Fabricating the core may include arranging structural pins into groups forming a truss, and supporting the pins in the groups by surrounding the pins with a layer of uncured structural foam. Arranging the pins may include inserting the pins into the layer of foam at differing angles and fabrication of the core may include bending and flaying the ends of the pins onto the faces of the core. Fabricating the core may further include splaying the ends of the pins and sandwiching the splayed ends of the pins between the faces of the foam layer and the facesheets.

According to still another embodiment, a method is provided of fabricating a reinforced composite sandwich core. The method comprises producing a layer of structural foam and inserting reinforcement pins into the foam layer, including arranging the pins into groups forming a truss within the foam layer.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 5 is an isometric illustration of one group of pins used in the core illustrated in FIG. 2.

FIG. 6 is a view in the direction 6-6 shown in FIG. 5 better showing the spacing between the pins in the group.

FIG. 6A is a plan view similar to FIG. 6, but diagrammatically illustrating the distal ends of pins after being flattened and flayed, and better depicting the spacing between the pins.

FIG. 7 is a view in the direction 7-7 shown in FIG. 6.

FIG. 8 is a view in the direction 8-8 shown in FIG. 6.

FIG. 9 is an illustration similar to FIG. 6 but showing an alternate form of a pin group employing three pins.

FIG. 10 is a sectional illustration showing the distal end of a pin bonded to a facesheet in the sandwich construction shown in FIG. 1.

FIG. 11 is an illustration similar to FIG. 10 but showing the distal end of a pin bonded between adjacent plies of the facesheet.

FIG. 12 is a graph illustrating the improvement in shear strength of a sandwich construction employing the reinforced core, compared with an unreinforced foam core.

FIG. 13 is a graph showing the results of three point bending tests used to determine the shear strength of sandwich constructions, including the disclosed embodiments.

FIG. 14 is a key for use in interpreting the graph shown in FIG. 13.

DETAILED DESCRIPTION

Figure 1:
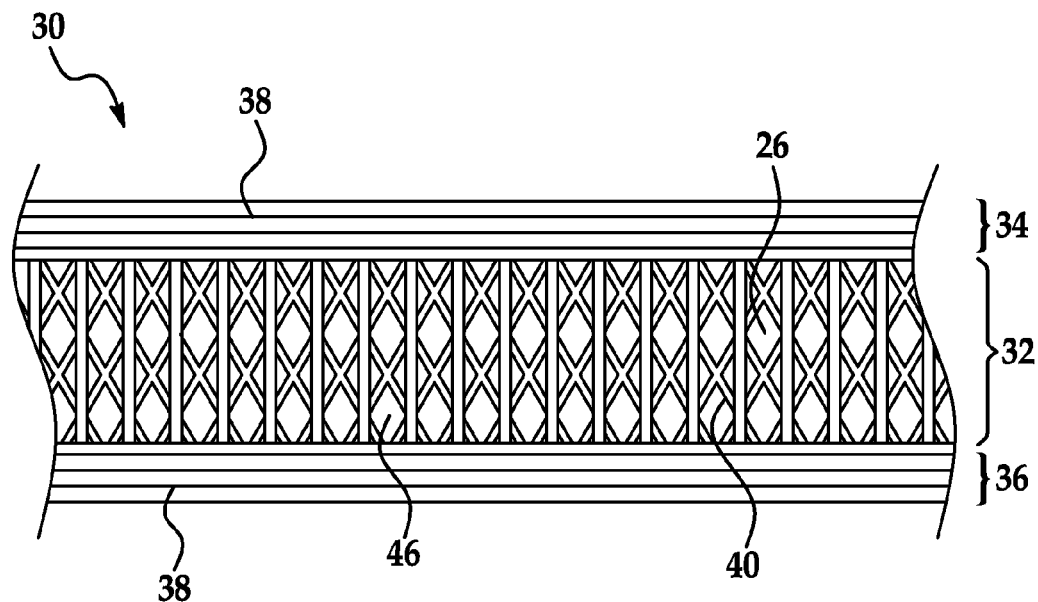
FIG. 1 is a cross sectional illustration of a composite sandwich having a reinforced core according to an embodiment.
Figure 2:
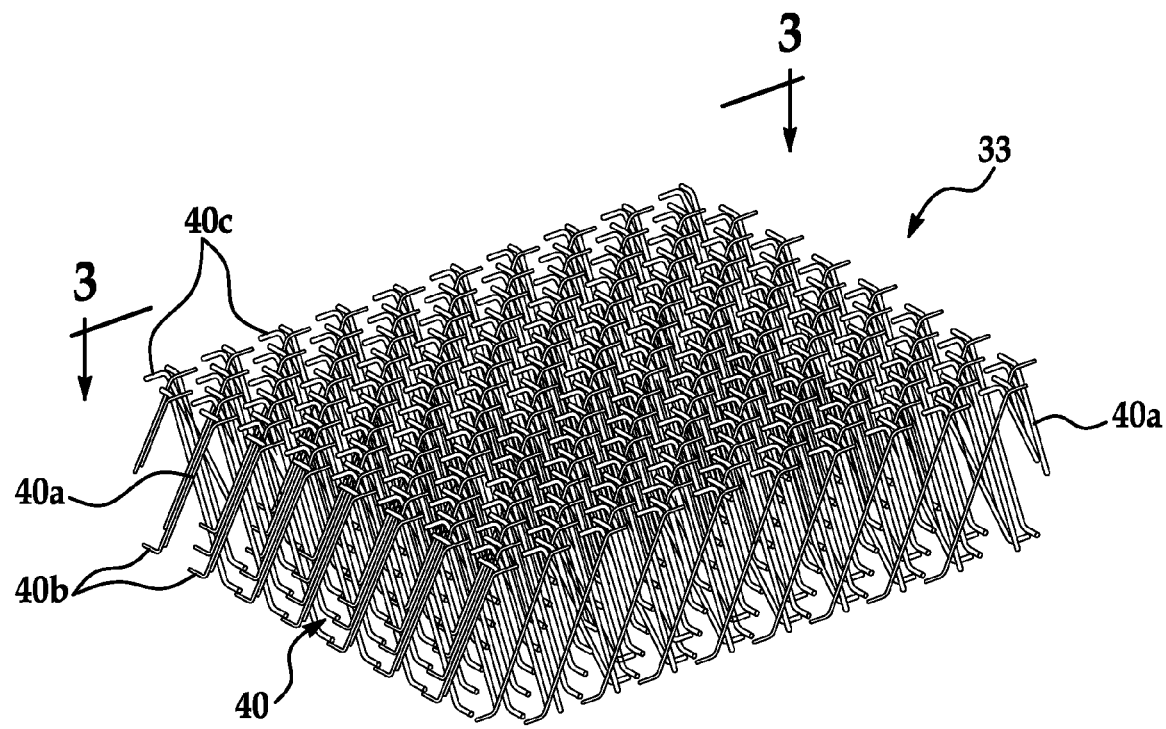
FIG. 2 is an isometric illustration of the reinforcing truss forming part of the core shown in FIG. 1.

Referring first to FIGS. 1-9, a composite sandwich construction generally indicated by the numeral 30 broadly comprises a reinforced core 32 sandwiched between and bonded to a pair of outer facesheets 34, 36. Each of the facesheets 34, 36 may comprise multiple plies 38 of fiber reinforced polymer resin, such as graphite fibers in cloth or other form, held in an epoxy binder. The embodiment of the composite sandwich construction 30 shown in FIG. 1 is substantially planar or flat, however, as will be discussed below, in other embodiments, the sandwich construction 30 may have one or more curvatures and may be formed into a variety of non-planar shapes.

The core 32 may broadly comprise a reinforcing truss 33 held in a matrix or carrier which may comprise a light weight, low density layer of foam 46. The foam layer 46 may comprise, without limitation, a polymethacrylimide (PMI) rigid closed cell foam known by the trade name ROHACELL®. ROHACELL® is commercially available in differing densities and thicknesses, and has a relatively low coefficient of linear thermal expansion. The foam layer 46 functions to hold the truss 33 in place during fabrication of the core 32 and also may add some degree of structural strength to the core 32. In some embodiments, the foam layer 46 may comprise a fugitive foam that is removed as by subjecting the finished structure 30 to elevated temperatures in an oven in order to incinerate the foam, leaving the truss 33 intact.

Figure 3:
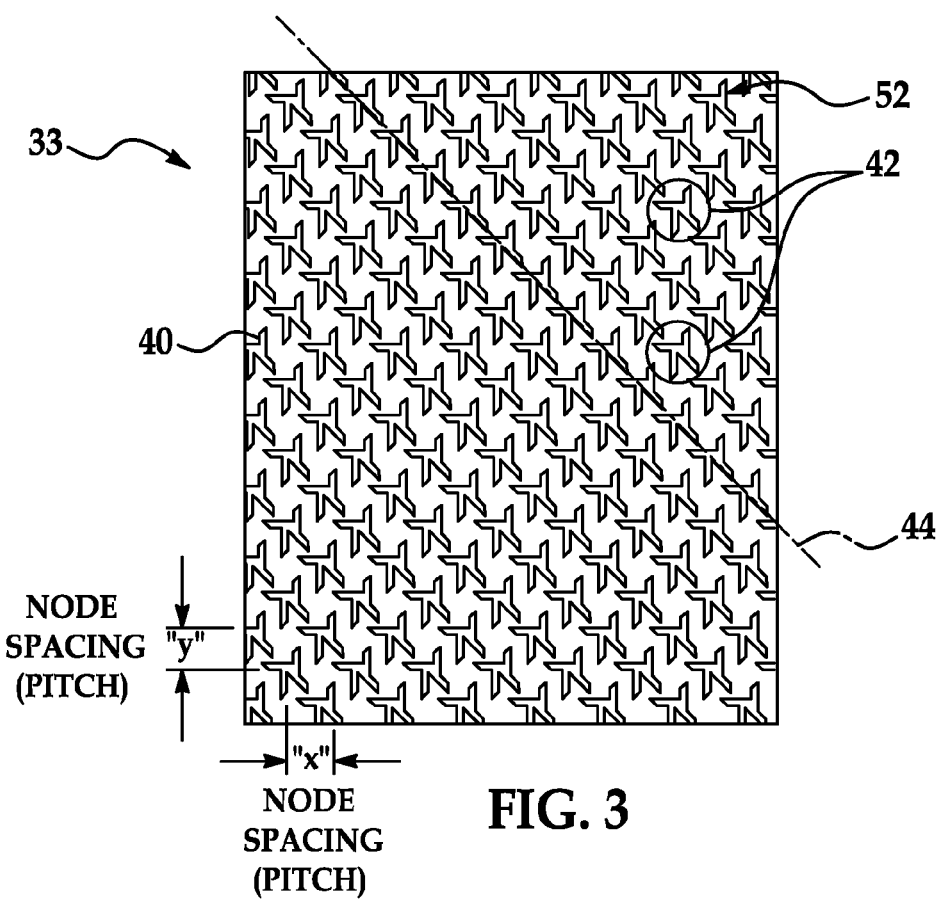
FIG. 3 is a plan illustration of the truss viewed in the direction 3-3 shown in FIG. 2.

The reinforcing truss 33 may comprise an array of structural pins 40 which are arranged in groups 42 that may be regularly spaced from each other, as best seen in FIG. 3, using pre-selected pitches "x" and "y". In one embodiment, the "x" and "y" pitches are equal, resulting in a square pitch that aligns the groups 42 along diagonal axes 44.

In one embodiment illustrated in FIGS. 5-8, the pins 40 are symmetrically arranged or distributed around a central axis 50 in each group 42, and are substantially circumferentially spaced equally from each other. In other embodiments however, depending on the application, the arrangement of the pins 40 around the central axis 50 may not be symmetrical, and/or the circumferential spacing of the pins 40 may not be equal. Each of the pins 40 includes medial portions 40a that are inclined relative to the planes of the facesheets 34, 36, and distal portions 40b, 40c which extend substantially parallel to the facesheets 34, 36. The medial portions 40a of the pins 40 are inclined from vertical at an angle φ (FIG. 4) which, in one embodiment may be approximately 30 degrees; other angles are possible.

As best seen in FIG. 6, when viewed in plan, the pins 40 in each group 42 are arranged in a crossing pattern such that they overlap each other and radiate outwardly from a node 52 that is aligned with the central axis 50. While four pins 40 per group 42 are illustrated in the embodiment shown in FIGS.

5-8, more or less than four pins 40 may be employed. Although the pins 40 shown in FIGS. 5-8 overlap each other when viewed in plan, they do not touch each other but rather are spaced from each other as indicated by the gap or space 53 between the pins 40 at the node 52 shown in FIG. 6. In some embodiments of the sandwich construction 30 that are substantially flat, such as that shown in FIG. 1, the pins 40 in each group 42 may touch each other, however, in other embodiments where the sandwich construction 30 is intended to have one or more curvatures therein, the provision of the gap 53 between the pins 40 allows the pins 40 in each group 42 to move relative to each other, without interfering with each other, during fabrication process, as will be discussed in more detail below.

FIG. 6A illustrates, on a larger scale, the distal ends 40c of the pins 40 having been flayed and flattened against the top surface 46a of the foam layer 46 following a processing step that will be described below. FIG. 6A also better illustrates the spacing 53 between the pins 40 and their circumferential arrangement around the node 52.

Figure 4:
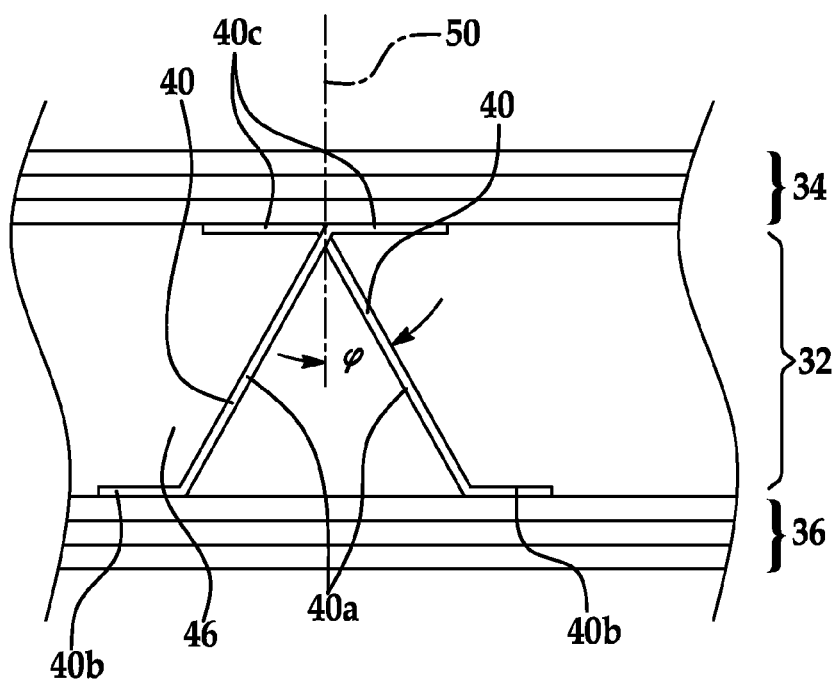
FIG. 4 is an enlarged, cross sectional illustration of the composite sandwich shown in FIG. 1.

As best seen in FIG. 4, in one embodiment, the distal portions 40b, 40c extend parallel and are bonded to the inside face of the facesheets 34, 36 respectively. As shown in FIG. 10, the length "L" of the distal portion 40b, 40c will depend upon the particular application, however in one embodiment the length "L" may be approximately 4 to 6 times the diameter of the pin 40. As will be discussed later in more detail, the length "L" may be determined by the process used to fabricate the core 32

In one embodiment, the pins 40 may be formed of pultruded graphite held in an epoxy binder. When the facesheets 34, 36 are bonded to the core 32, the resin binder in the distal ends 40b, 40c of the pins 40 fuses (i.e. co-mingles) with resin binder 48 that migrates from an adjacent facesheet ply 34a (FIG. 10), so that the flayed distal ends 40b, 40c of the pins 40 become bonded to and form a part of the facesheets 34, 36. Desirably, the resin binders used in the pins 40 and the facesheet ply 34a are the same, or are at least compatible, so that when cured, the co-mingled resin binders form a solidified matrix that exhibits maximum strength. Alternatively, the distal ends 40b, 40c (see for example, 40c in FIG. 11) may be bonded between adjacent plies 34a, 34b of the facesheets 34, 36, thereby locking the ends of the pins 40 within the facesheets 34, 36. A dry film adhesive is placed between core 32 and facesheets 34 and 36 to improve bonding of distal ends 40b, 40c with the facesheets 34, 36. The epoxy binders in pins 40, the dry film adhesive and the facesheets 34, 36 should be chosen for their compatibility so that they fuse during the cure process at the same cure temperature. The amount and type of the dry film may significantly affect the strength of the finished structure.

As will be discussed below, the selection of the values for certain parameters characterizing the core 32 including the truss 33, provide a particularly durable and reliable sandwich construction 30 that may be readily scaled to meet the requirements of various applications. The parameters of particular interest in constructing the sandwich structure 30 include: the type of carrier foam 46, the diameter of the pins 40, the orientation angle φ of the pins 40 (from vertical), the spacing of the pins from each other, the reveal height ("L") of the pins 40, the number of pins in each pin group 42, and the particular type of material used to fabricate the pins 40.

FIG. 12 illustrates the superior structural properties of two embodiments relative to a sandwich construction employing a un-reinforced core. Curves 60 and 64 represent the shear strength as a function of temperature for a sandwich construction 30 employing a reinforced core according to the disclosed embodiments using foam densities of 12 and 6.9 pounds per cubic foot, respectively. In contrast, the curves represented by 62 and 66 show the shear strength for a ½ inch core using un-reinforced ROHACELL® foam of 12 and 6.9 pounds per cubic foot, respectively. As is apparent from the test results shown in FIG. 12, embodiments of the disclosure employing the reinforced core 32 exhibit superior shear strength compared to unreinforced cores of the same density.

Figures 15, 16:
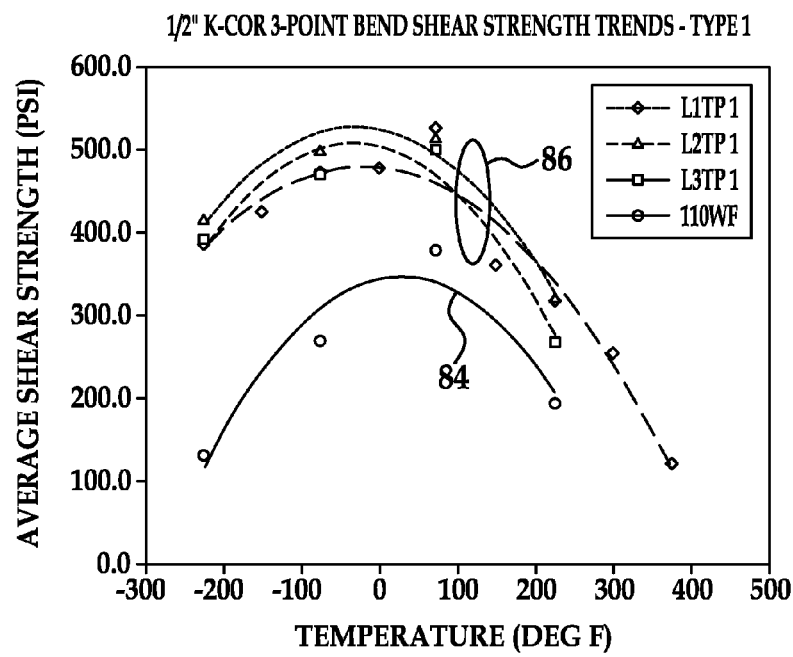
FIG. 15 is a table showing values for key parameters characterizing the disclosed embodiments.
FIGS. 16-23 are graphs showing the results of tests performed on various embodiments of the sandwich construction, compared to sandwich constructions employing an unreinforced foam core.

Referring to FIGS. 13 and 14, a series of tests were performed that were used to identify the parameters of the sandwich structure 30 that could be used to provide substantially improved structural properties for the sandwich structure 30 while assuring adequate bond strength and avoiding core cracking or other deterioration of the core 32. A key for interpreting the test result curves in FIG. 13 is shown in FIG. 14. For example, a sandwich construction was fabricated using values for various parameters that provided test results represented by curve "A" in FIG. 13. The particular embodiment represented by curve "A" included a core 32 having a density of 12.08 pounds per cubic foot, ½" thick, pins 40 having a diameter of 0.020 inches inclined at 35 degrees relative to vertical, a reveal height ("L") of 0.080 inches and a pin density of 8.8. Using the test results shown in FIG. 13, values for a group of parameters have been developed for various applications, as shown in FIG. 15. These parameters include core density 68, core thickness 70, pin diameter 72, pin angle from vertical 74, pin spacing (pitch), pin reveal length 78, number of pins per node and the type of foam carrier 82. The desired foam density ranges between 6.9 and 12 pounds per cubic foot. The core thickness ranges from to 1 inch, while pin diameter is between 0.02 and 0.028 inches. The preferred pin angle is approximately 30 degrees and the square pitch spacing between nodes 52 ranges from 0.168 to 0.191 inches. The reveal height ("L") is approximately 0.055 inches. Four pins per node were employed and the carrier foam is a PMI such as a type 51WF ROHACELL®.

Using the values for the parameters shown in FIG. 15, a series of tests on sandwich samples were performed; the results of these are shown in FIGS. 16-23. FIG. 16 shows the results of tests performed on various sandwich constructions 30 having a ½" core 32 using a three point bend shear strength test in accordance with ASTM C-393. ASTM C-393 is a standardized test method used to determine the core shear properties of flat sandwich constructions subjected to flexure in a manner such that the applied moments produce curvature of the sandwich facing planes. Graphs 86 represent the test results for three embodiments of the truss reinforced core 32 having a density of 6.9 pounds per cubic foot, while graph 84 represents the test results using an unreinforced core comprising ROHACELL® foam. The test results are provided in terms of the average shear strength in pounds per square inch as a function of temperature.

Figure 17:
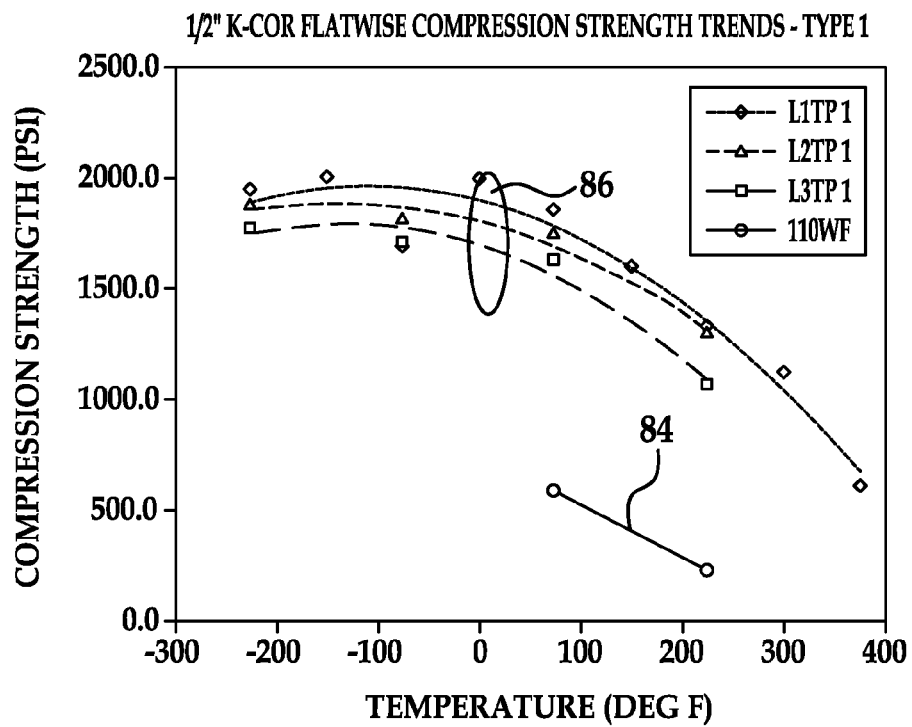
Figure 18:
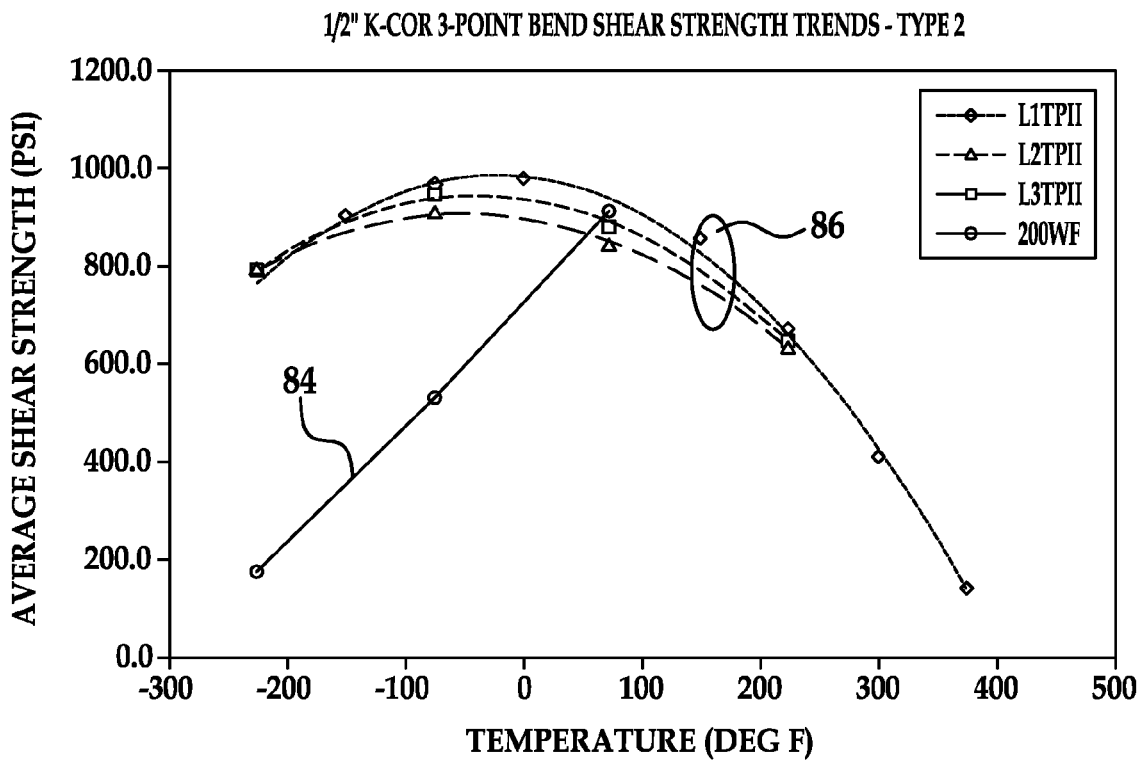
Figure 19:
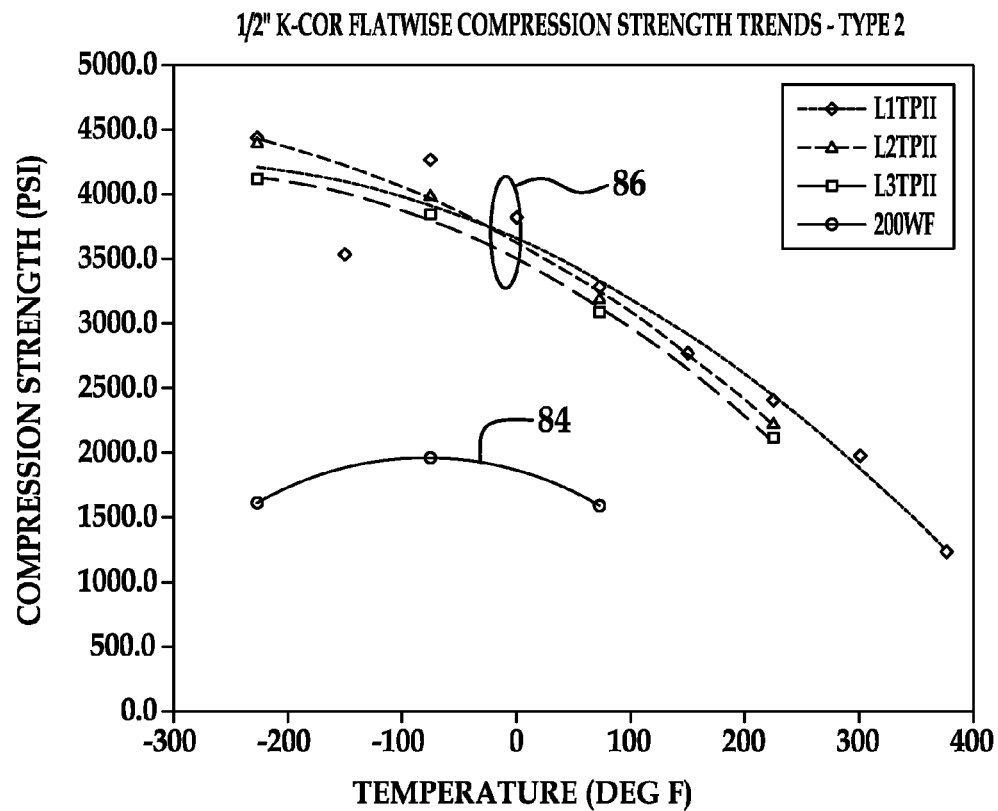

The samples represented by the test results shown in FIG. 16 were also subjected to flat-wise compression strength testing in accordance with ASTM C365, resulting in the test results shown in FIG. 17. The test results in FIG. 17 are provided in terms of compression strength in pounds per square inch as a function of temperature. FIGS. 18 and 19 show test results similar to FIGS. 16 and 17, but for test samples employing densities of 12 pounds per cubic foot.

Figure 20:
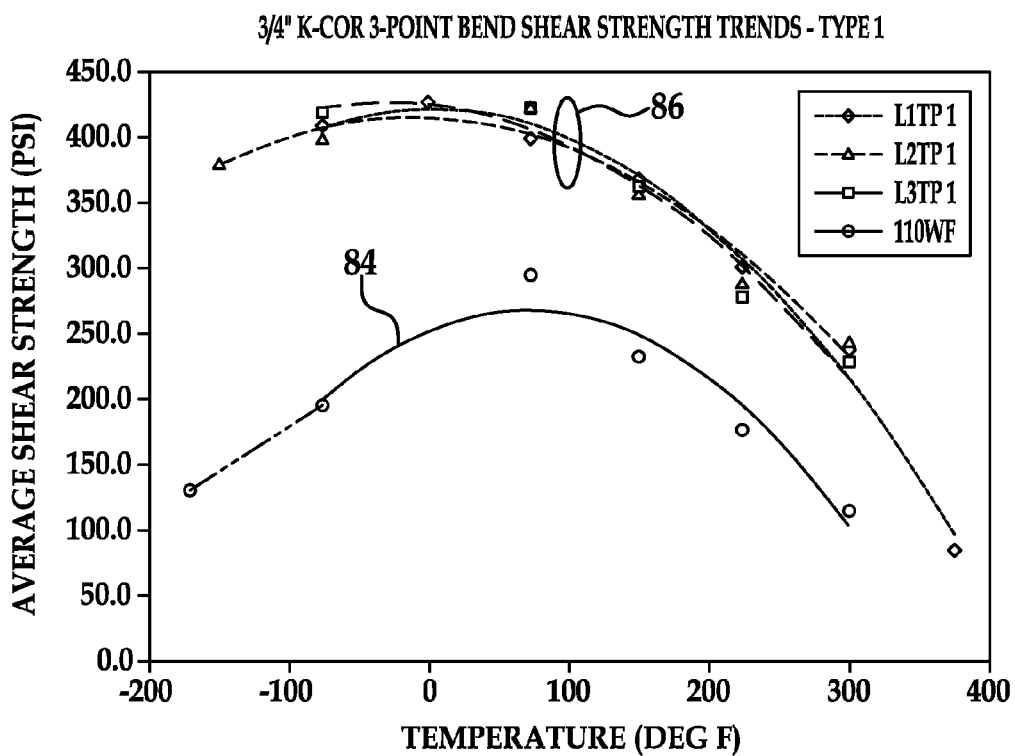
Figure 21:
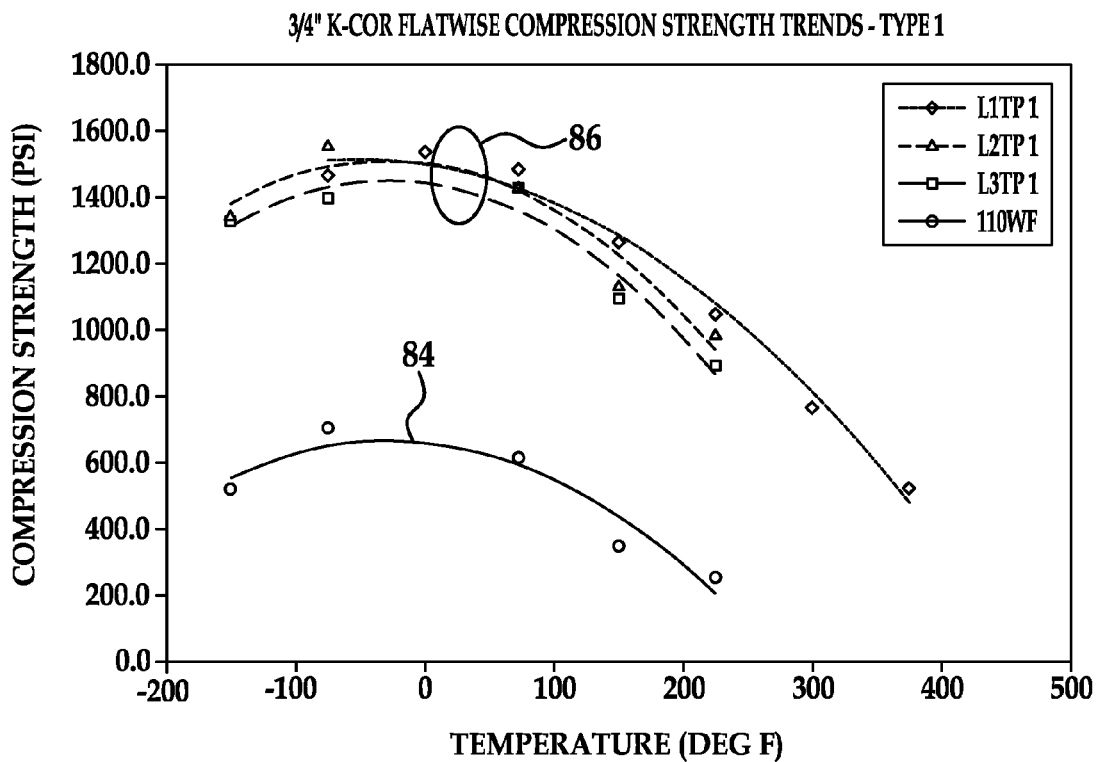
Figure 22:
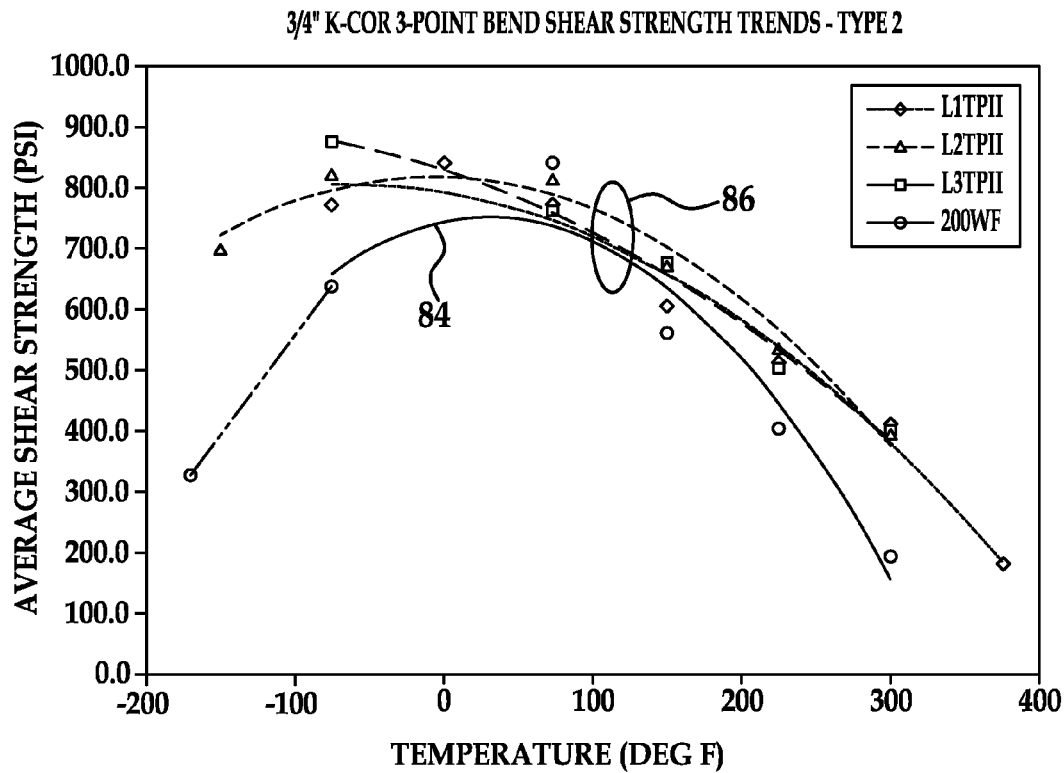
Figure 23:
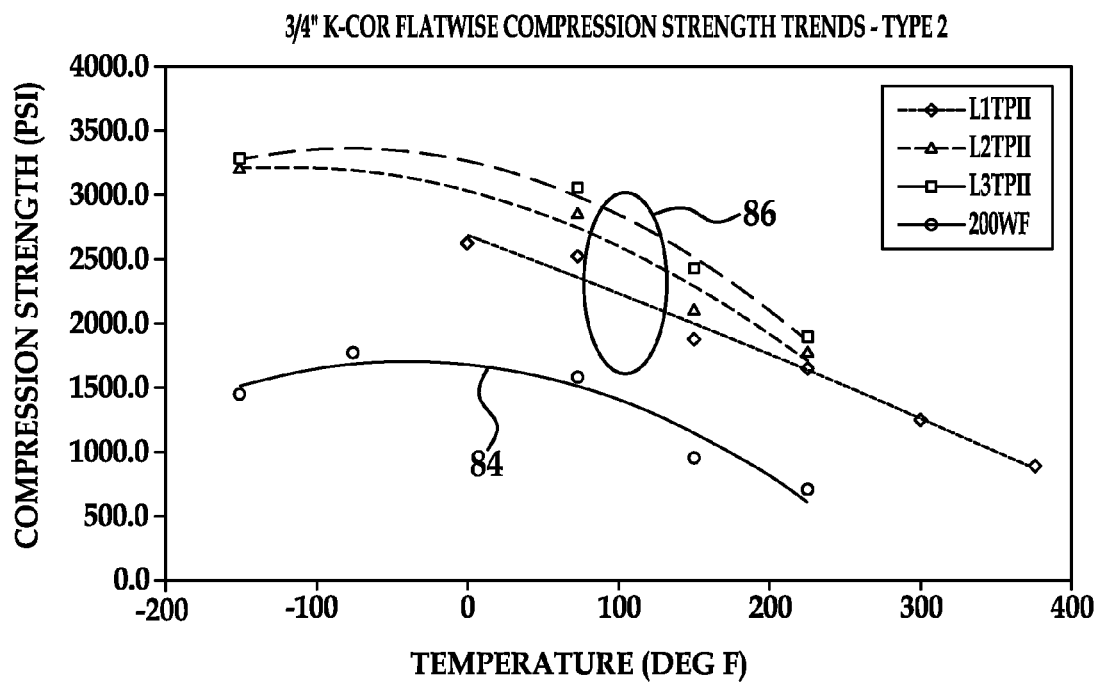

FIGS. 20 and 21 provide comparative test results for samples having ¾" thick cores 32 and densities of 6.9 pounds per cubic feet. Similarly, FIGS. 22 and 23 provide test results for samples having ¾" thick cores and densities of 12 pounds per cubic feet.

As is evident from the test results represented by the graphs shown in FIGS. 16-23, test samples employing values of the parameters within the ranges listed in FIG. 15 exhibit substantially superior shear and compressive strengths compared to sandwich constructions with un-reinforced cores.

Figure 24:
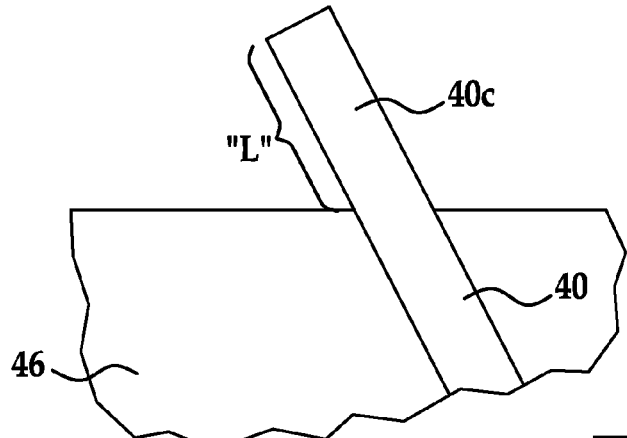
FIG. 24 is a sectional illustration showing an intermediate step in a fabrication method in which the pins are inserted into a foam core, the distal end of the pin shown protruding from the core before the pin is flayed.
Figure 25:
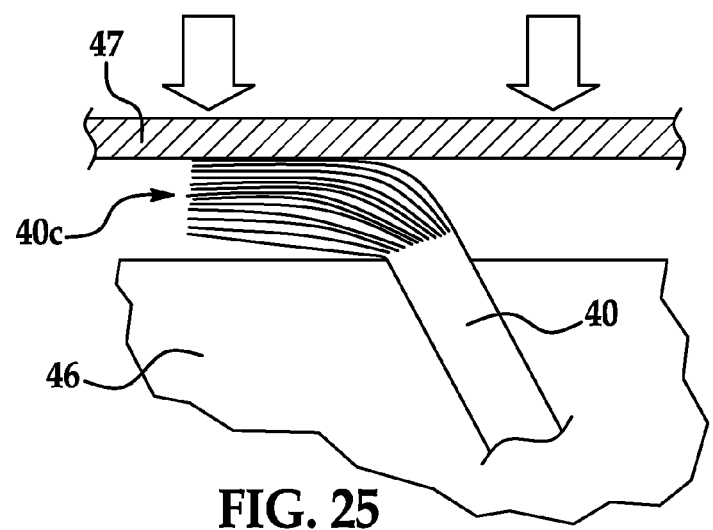
FIG. 25 shows another step in the fabrication method, in which a heated platen bends and flays the distal ends of the pin.
Figure 26:
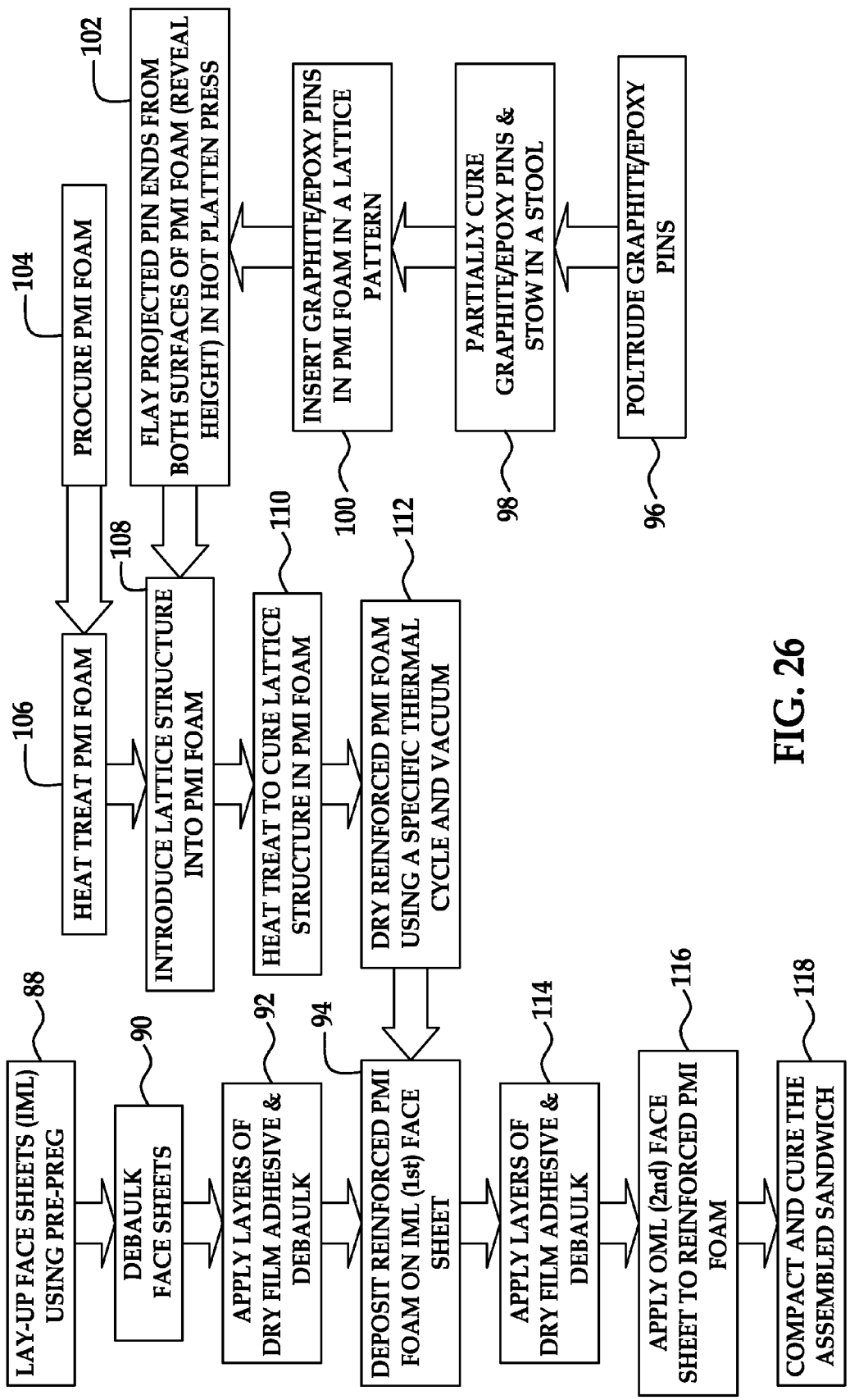
FIG. 26 is a flow diagram illustrating a method for fabricating the composite sandwich.
Figure 27:
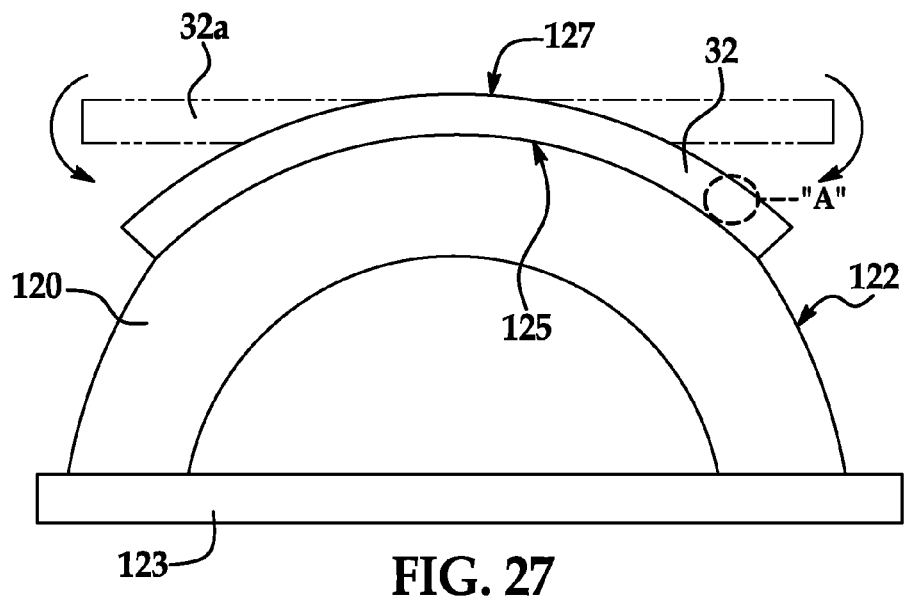
FIG. 27 is an illustration of a reinforced core being formed over a curved tool.
Figure 28:
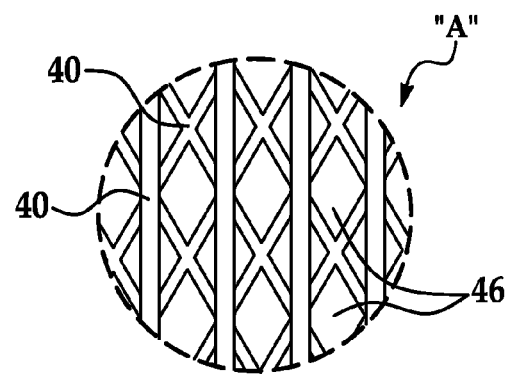
FIG. 28 is an illustration of the area designated as "A" in FIG. 27.
Figure 29:
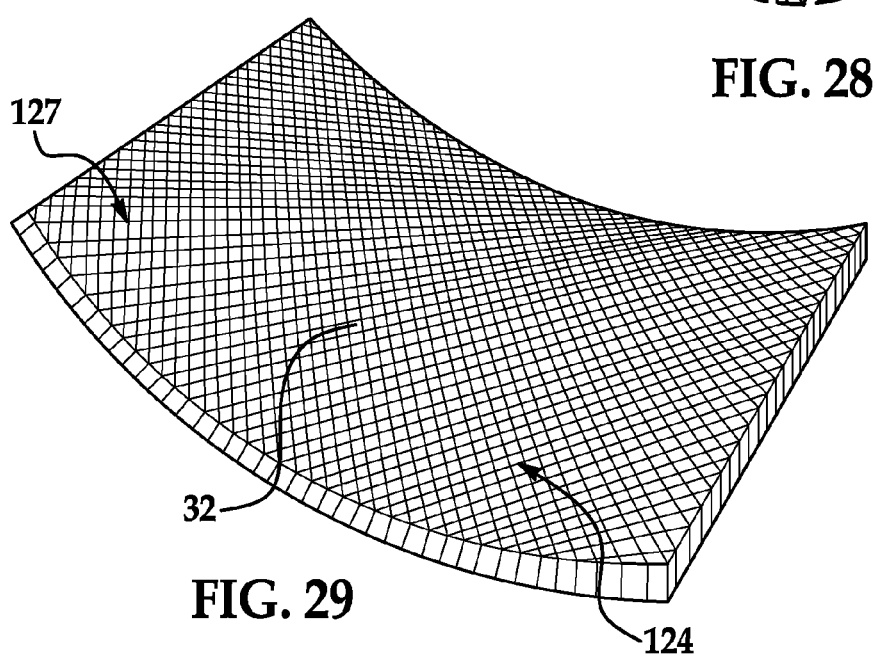
FIG. 29 is an illustration of a perspective view of the core formed on the tool shown in FIG. 27.

Referring now concurrently to FIGS. 24-26, a method of fabricating a composite sandwich 30 begins at step 88 with laying up facesheets 34, 36 using prepreg which may comprise graphite fabric or other forms of graphite fiber impregnated with a polymer resin such as epoxy. In other embodiments, the facesheets 34, 36 may be fabricated by infusing resin into a preform of dry fabric or tacked fabric. Next, at step 90, the facesheets 34, 36 are debaulked. Then, at step 92, a dry film adhesive is applied to the facesheets 34, 36 and the lay-up is again debaulked.

Separately, the core 32 is prepared, by following steps 96-112. Beginning at step 96, the pin material is developed by pultruding graphite/epoxy, which comprises pulling fine carbon fibers through a die and resin bath. The pin material is partially cured and taken up on a spool at step 98. At step 100, the graphite/epoxy pins 40 are inserted into a layer of PMI foam 46 in a three dimensional lattice pattern. The pin insertion process may be performed using commercial equipment (not shown) that includes, without limitation, an automated tool head operated by a programmed computer. The insertion head inserts the pin material from any desired angle from vertical, and following the insertion, a fixed length is automatically cut and the insertion depth is adjusted so that a desired reveal height "L" is exposed at the top and bottom surfaces of the foam layer 46. The pins 40 are inserted along trajectories that are indexed around the central axis 50. FIG. 24 shows one of the pins 40 having just been inserted into the foam layer 46, with the distal portion 40c extending above the upper surface of the foam layer 46 corresponding to a reveal height "L".

Next, at step 102, the distal portions 40b, 40c are flayed and bent in a process shown in FIG. 25, wherein a hot press platen 47 moves downwardly into contact with the distal portions 40c, bending the fibers and partially melting the epoxy binder, so as to cause the fibers to splay open and separate into whiskers, generally parallel to the outer surfaces of the foam layer 46. Since the pins 40 comprise multiple fine, whisker-like fibers and pultruded resin, when pressure is applied to the distal portions of the pins 40 by the hot platen press, the fibers in the distal portions open like a fan instead of bending as a unit. Step 108 represents completion of the formation of the truss 33 within the foam layer 46.

The foam layer 46 may be either procured as shown at step 104 as a purchased component or fabricated, following which the foam layer 46 is heat treated at step 106. Heat treatment of the foam layer 46 may be optionally required in some cases where the foam may have a tendency to absorb atmospheric moisture. Heat treating of the foam layer 46 both removes the moisture and may improve the mechanical strength of the foam layer 46 so that the foam layer 46 better supports the pins 40 and provides some degree of structural strength for the core 32.

With the truss 33 having been formed in the foam layer 46 at step 108, the core 32 is then heat treated at step 110 in order to cure the truss 33. The heat treatment at step 110 results in a full cure of the partially cured pins 40. The preformed core 32 is then dried at step 112. The drying at step 112 may include a primary drying step followed by a final dry and pre-layup drying cycle. The purpose of this two step drying cycle is to remove any remaining moisture in the preform core 32, as well as to assure that the truss 33 is completely cured. The primary drying step may comprise successively increasing the temperature according to a predefined schedule over time, however the exact schedule will depend upon the application. The final drying step may involve subjecting the core 32 to a constant temperature for a period of time, for example, 250° F. for a period of 8 to 24 hours, in one embodiment.

At step 94, the fully formed and cured core 32 is deposited on facesheet 34, and then layers of dry film adhesive are applied to the remaining, exposed face of the core 32. The dry film adhesive may comprise, for example, a 350 degree F. cure epoxy film adhesive commercially known as FM300 film adhesive available from Cytec. Following debaulking at step 114, the second facesheet 36 is applied to the exposed, remaining face of the core 32, as shown in step 116. Finally, the sandwich structure 30 is compacted and cured at step 118.

Attention is now directed to FIGS. 27-30 which illustrate the fabrication of a reinforced core 32 having one or more curvatures. In the illustrated example, the core 32 is curved in a single dimension, however depending upon the application, the core 32 may be formed into a variety of shapes having simple or compound curves and/or undulations, as well as a combination of flat and curved sections. The core 32 may be fabricated using the methodology previously described (see FIGS. 24, 25 and 26) in which composite pins 40 are inserted into a substantially flat layer of structural foam 46, wherein the pins are arranged into groups 42 centered around nodes so as to form a truss-like reinforcement within the layer of foam 46. Also, as previously described, the distal portions 40b, 40c (FIG. 30) are splayed and then folded or bent onto the faces 125, 127 of the foam layer 46. The flat core 32 may then be placed on a forming tool 120 (FIG. 27) having one or more curved tool surfaces 122. The flat core indicated at 32a in broken lines is uncured at this point, and is therefore possess a degree of flexibility.

The flat core 32a is then bent or formed down over the curved tool surface 122, thereby imparting a curvature into the core 32, resulting in curved inner and outer core surfaces 125, 127. The bending or forming of the flat core 32a may be carried out using vacuum bagging techniques, a press having an additional tool (not shown) that mates with tool 120, or even by hand labor or any other suitable means. Once formed onto the tool 120, the resulting core 32 maintains its curvature.

Prior to bending of the flat core 32a, the relative positions of the pins 40 in each group thereof are substantially those in which the pins were initially inserted, similar to the positions shown in FIGS. 5-8. However, as the flat core 32a is being formed over the tool 120, some of the pins 40 may shift or be displaced relative to each other within the foam layer 46 in order to accommodate the change in curvature of the foam layer 46.

Figure 30:
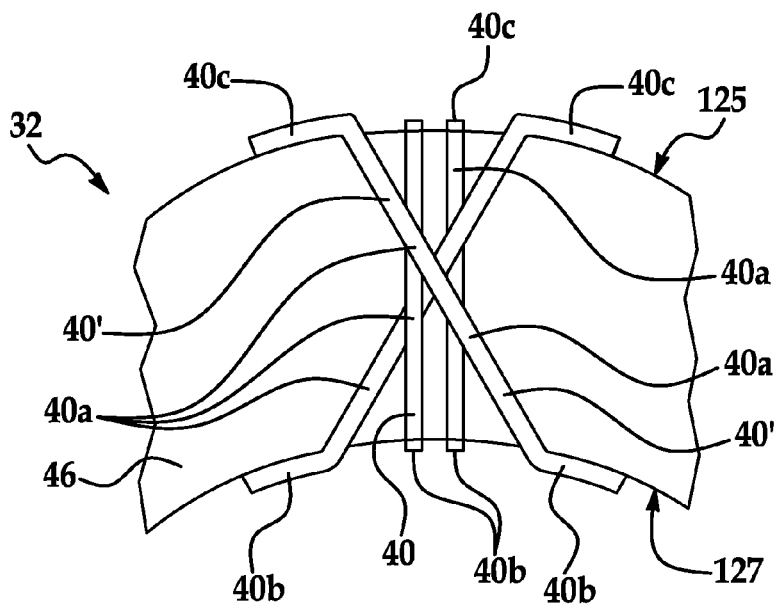
FIG. 30 is an illustration of a side view of a group of pins held in a layer of foam forming part of the core shown in FIGS. 27 and 29 wherein the curvature of the core has been exaggerated to better illustrate displacement of the pins during the forming process.

Due to the initial placement of the pins 40 in each group thereof and the fact that there is a slight spacing or gap 52 (FIG. 6) between the pins 40, the pins 40 are free to move slightly during the curvature forming process, without interfering with each other. For example, FIG. 7 illustrates the position of a group of pins 40 that have been inserted into a flat layer of foam 46. Following bending, however, as shown in FIG. 30 two of the pins 40' can be seen to have been displaced relative to each other to accommodate bending of the foam layer 46. It may thus be appreciated that the core 32 may be formed into a variety of curved shapes without materially diminishing the reinforcement strength provided by the truss 33 (FIG. 2) formed by the reinforcement pins 40.

As previously mentioned, the ability of the core 32 to be formed into a variety of shapes, including those having curvature, permits fabrication of composite sandwich structures having a wide variety of shapes. For example, referring to FIGS. 31 and 32, the fabrication techniques described above may be employed to produce a reinforced core 126 having the shape of a truncated cone 128. The core 126 may be covered with composite facesheets (not shown) to form a completed lightweight, high strength composite sandwich structure that may be employed in a variety of applications, such as a nose cone for an aerospace vehicle (not shown). FIG. 32 illustrates a portion of the outer surface of the core 126 which reveals groups of the reinforcement pins 40 held in a layer of carrier foam 46 in which distal ends 40c of the pins 40 are splayed and folded over onto the core 126.

Figure 31:
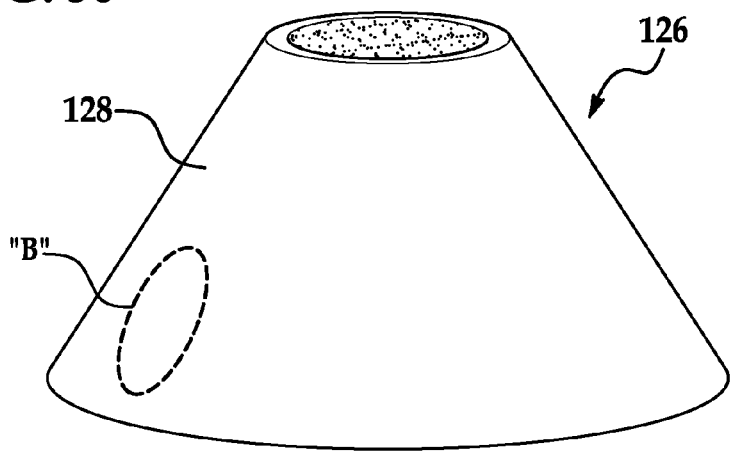
FIG. 31 is an illustration of a reinforced core having the shape of a truncated cone.
Figure 32:
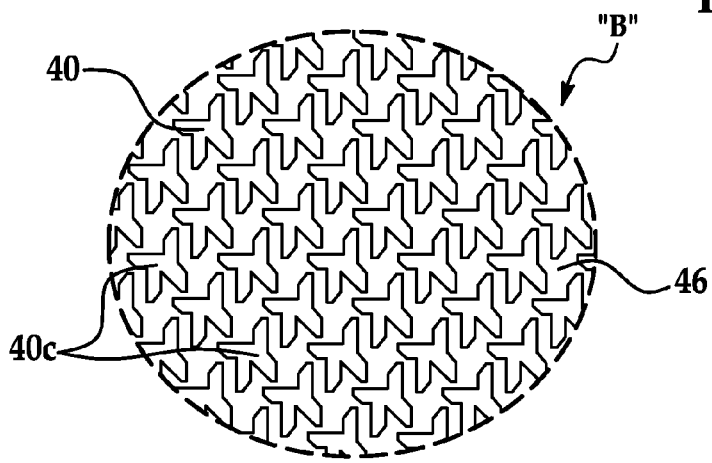
FIG. 32 is an illustration of the area designated as "B" shown in FIG. 31.
Figure 33:
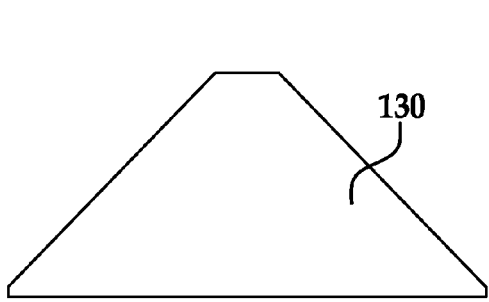
FIG. 33 is an illustration of a side view of a tool used to fabricate the core shown in FIG. 31.
Figure 34:
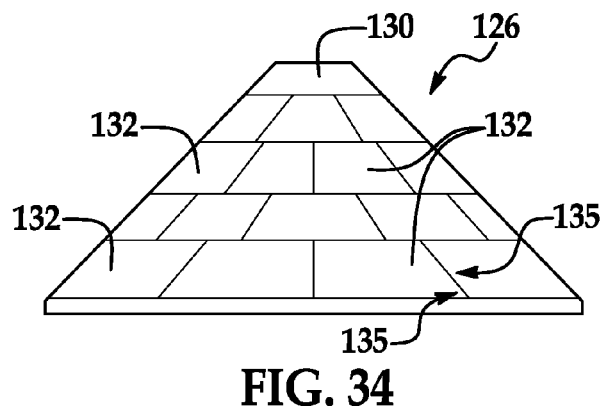
FIG. 34 is an illustration similar to FIG. 33 but showing core segments having been spliced together and formed onto the tool of FIG. 33.
Figure 35:
FIG. 35 is an illustration of a plan view of a core segment prior to being shaped and formed onto the tool shown in FIG. 33.
Figure 36:
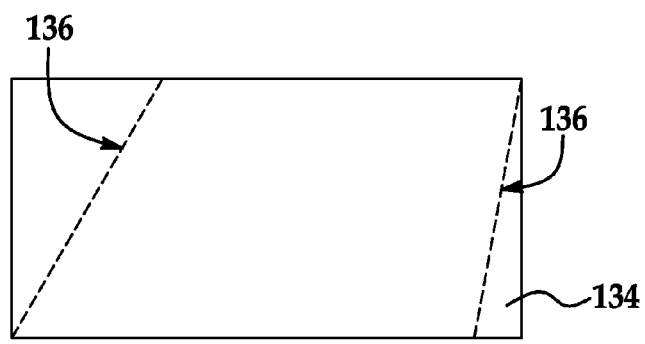
FIG. 36 is an illustration of the core segment shown in FIG. 35 but showing a pattern for cutting the core segment to a desired shape.
Figure 37:
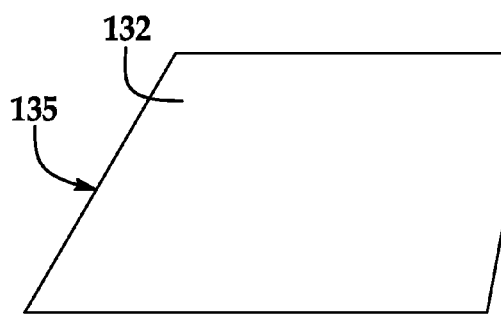
FIG. 37 is an illustration similar to FIG. 36 but showing the core segment having been cut to the desired shape.
Figure 38:
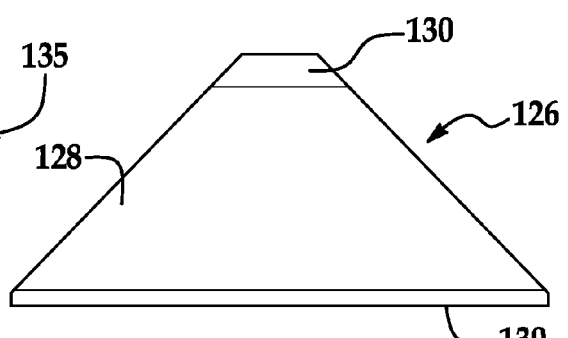
FIG. 38 is an illustration of a completed core formed over the tool of FIG. 33 using the core segments shown in FIG. 34.

The core 128 illustrated in FIG. 31 may be fabricated using a suitable tool 130 such as that shown in FIG. 33 which likewise has the shape of a truncated cone. The core 132 is formed by a plurality of core segments 132 which are spliced together and formed onto the tool 130, as shown in FIG. 34. The core segments 132 are produced using a core blank 134 as shown in FIG. 35 which, in the illustrated example, is generally rectangular. As shown in FIG. 36, the core blank 134 may be cut along pattern lines 136 to form the shaped core segment 132 shown in FIG. 37. The individual core segments 132, having been cut to the desired shape, are then placed on and formed onto the contour of the tool 130, thereby imparting a curvature to the core segment 132 in the shape of the tool 130. The core segments 132 may be spliced together along their mutual edges (FIGS. 34 and 37) using a suitable bonding adhesive. FIG. 38 illustrates the core segments 132 having been formed onto the tool 130 and spliced together.

Figure 39:
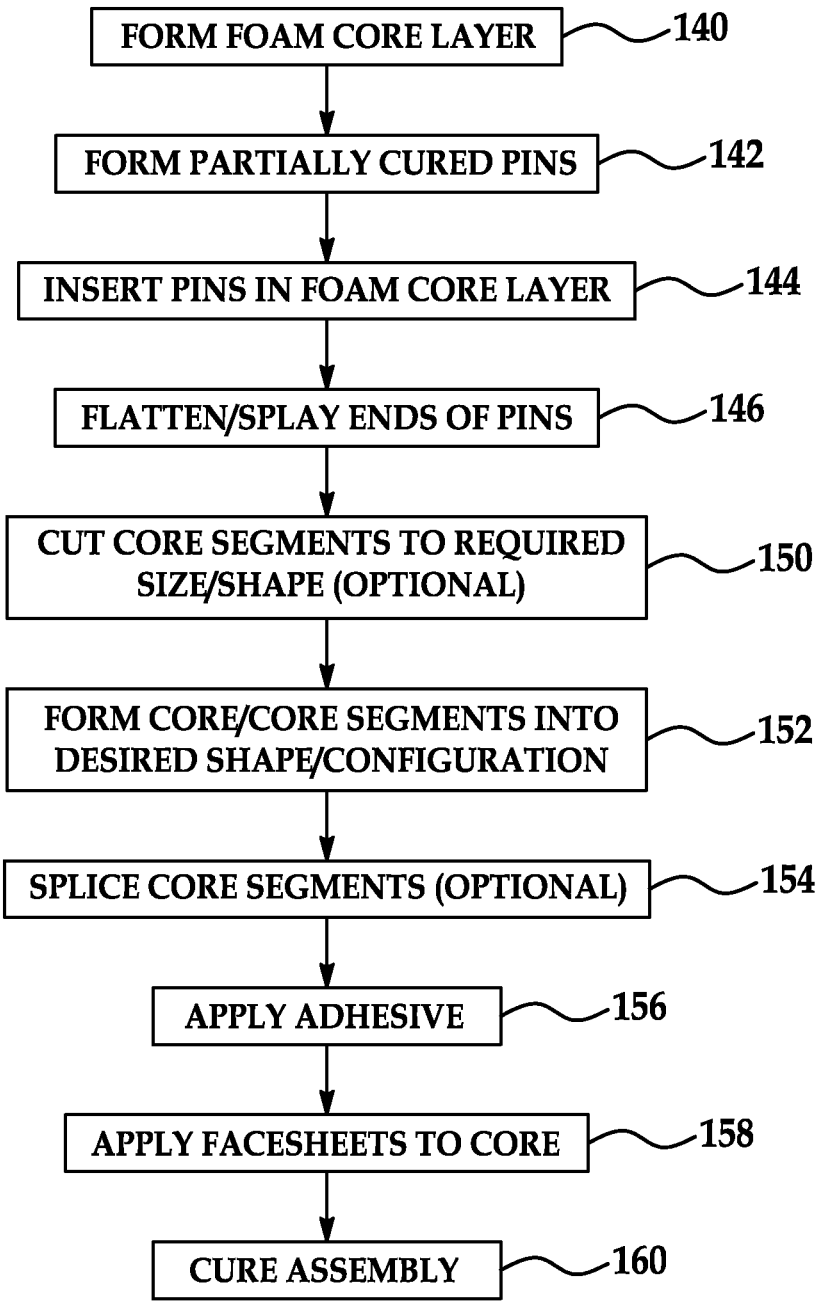
FIG. 39 is an illustration of a flow diagram of a method for forming a reinforced composite sandwich structure having one or more curvatures.

Attention is now directed to FIG. 39 which broadly illustrates the steps of a method for fabricating shaped composite sandwich structures, including shaped reinforced cores. Beginning at 140, a core layer 46 is formed, using structural foam and conventional fabrication techniques. At 142, partially cured composite pins 40 are formed using protrusion or other techniques. At 144, the partially cured pins 40 are inserted into the foam core layer 46 using automated equipment or other techniques, as previously described. Next, at 146, the distal ends 40b, 40c of the pins 40 are flattened and splayed onto the outer faces of the foam core layer 46.

In those applications where it is necessary to fabricate the core 32 from multiple core segments 132, step 150 is performed which consists of cutting the core segments 132 to the required size and shape. Next, the core 32 or core segments 132 are formed to the desired shape and configuration, typically using a shaping tool (120, 130). Next, in those applications where the core 32 is formed from segments 132, it may be necessary to splice the core segments 132 together as shown at step 154. At 156, a suitable adhesive is applied to the opposite faces of the core 32, following which the facesheets 34, 36 are applied to the core 32 in order to form a sandwich structure. Finally, at 160 the assembled sandwich structure comprising the core 32 and facesheets 34, 36 is cured using conventional techniques such as autoclaving.

Figure 40:
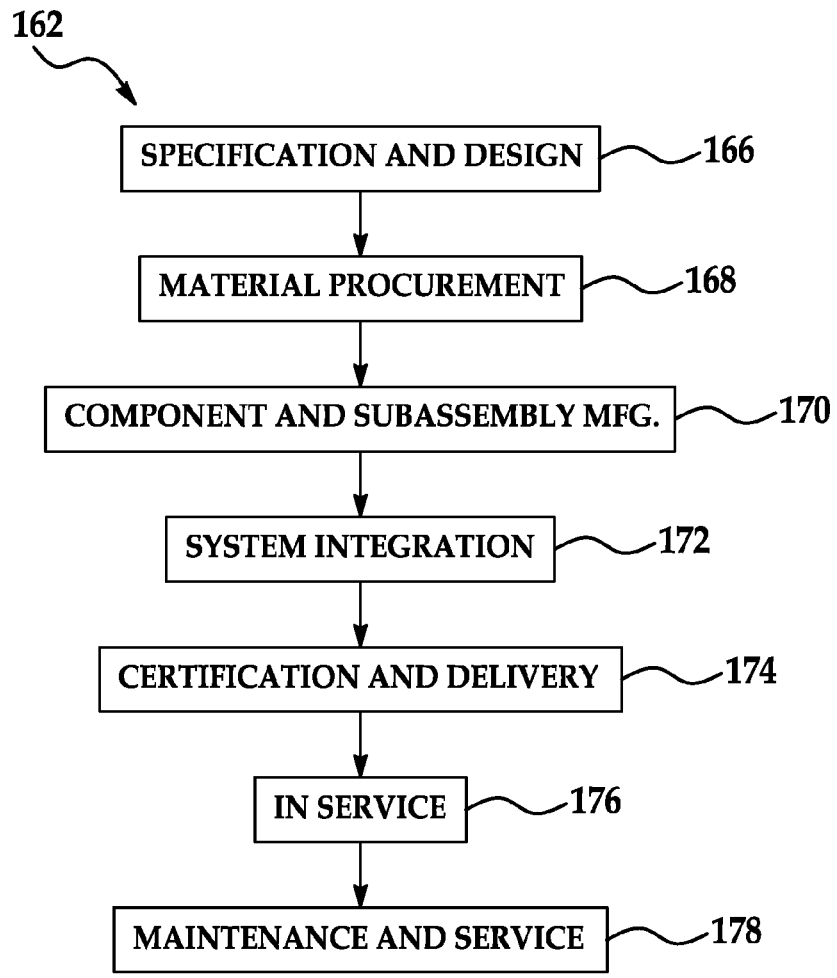
FIG. 40 is a flow diagram of aircraft production and service methodology.
Figure 41:
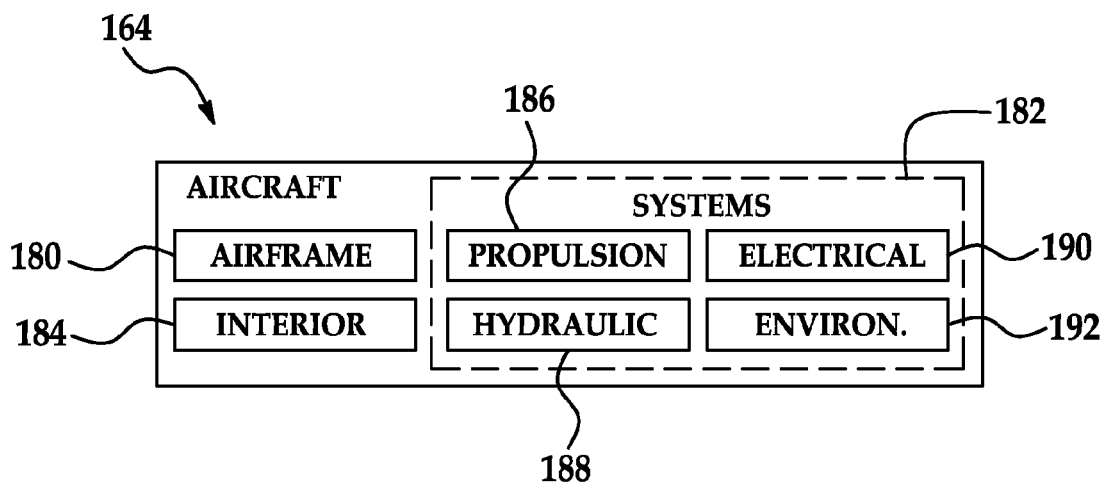
FIG. 41 is a block diagram of an aircraft.

Embodiments of the disclosure may find use in a variety of potential applications, particularly in the transportation industry, including for example, aerospace and automotive applications. Thus, referring now to FIGS. 40 and 41, embodiments of the disclosure may be used in the context of an aircraft manufacturing and service method 162 as shown in FIG. 40 and an aircraft 164 as shown in FIG. 41. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 162 may include specification and design 166 of the aircraft 164 and material procurement 168. During production, component and subassembly manufacturing 170 and system integration 172 of the aircraft 164 takes place. Thereafter, the aircraft 164 may go through certification and delivery 174 in order to be placed in service 176. While in service by a customer, the aircraft 164 is scheduled for routine maintenance and service 178 (which may also include modification, reconfiguration, refurbishment, and so on.

The preferred method of the invention is well suited for forming thermoplastic composite stiffened members in the supporting framework of an aircraft fuselage. Potential examples of thermoplastic composite stiffened members include but are not limited to fuselage skins, wing skins, control surfaces, door panels and access panels. Stiffening members include but are not limited to keel beams, floor beams, and deck beams. For illustrative purposes only, the invention will initially be described in reference to forming a thermoplastic composite floor beam 20 for use in a commercial aircraft fuselage. However, while an I-section is shown, other stiffened member geometries such as Z-section, U-section, T-section, etc. will also be later described, including those having curvature along their length.

Each of the processes of method 162 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 41, the aircraft 164 produced by exemplary method 162 may include an airframe 180 with a plurality of systems 182 and an interior 184. Examples of high-level systems 182 include one or more of a propulsion system 186, an electrical system 190, a hydraulic system 188, and an environmental system 192. Any number of other systems may be included. Although an aerospace example is shown, the principles of the invention may be applied to other industries, such as the automotive industry.

The apparatus embodied herein may be employed during any one or more of the stages of the production and service method 162. For example, components or subassemblies corresponding to production process 170 may be fabricated or manufactured in a manner similar to components or subassemblies produced while the aircraft 164 is in service. Also, one or more apparatus embodiments may be utilized during the production stages 170 and 172, for example, by substantially expediting assembly of or reducing the cost of an aircraft 164. Similarly, one or more apparatus embodiments may be utilized while the aircraft 164 is in service, for example and without limitation, to maintenance and service 178.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A composite sandwich, comprising:
   a first composite facesheet and a second composite facesheet; and
   a reinforced core sandwiched between the first composite facesheet and second composite facesheet, the reinforced core including:
      a plurality of pins arranged in groups forming a truss, wherein the plurality of pins include medial portions extending between the first composite facesheet and the second composite facesheet and distal portions respectively extending generally parallel with and bonded to the first composite facesheet and the second composite facesheet, wherein the plurality of pins further comprise first ends and second ends, and wherein the groups comprise subsets of three or more pins of the plurality of pins that are arranged in a crossing pattern at about the corresponding first ends, are spaced apart at about the corresponding first ends, are substantially circumferentially spaced equally from each other at about the first ends, and wherein each pin of the three or more pins overlaps at least one first other pin of the three or more pins and is overlapped by at least one second other pin of the three or more pins; and a carrier surrounding the pins.

2. The composite sandwich of claim 1, wherein corresponding locations where the corresponding first ends of the subsets of pins are touching comprise corresponding nodes.

3. The composite sandwich of claim 2, wherein distal portions of the pins in each of the groups radiate outwardly from the corresponding nodes.

4. The composite sandwich of claim 2, wherein the corresponding nodes of the groups are spaced substantially equidistant from each other.

5. The composite sandwich of claim 1, wherein the distal portions of each of the pins are splayed and are sandwiched between the core and one of the first composite facesheet and the second composite facesheet.

6. The composite sandwich of claim 1, wherein:
each of the pins includes carbon fiber reinforced resin, and
each of the first composite facesheet and the second composite facesheet includes laminated plies of carbon fiber reinforced resin.

7. The composite sandwich of claim 1, wherein pins in each of the groups are inclined relative to planes of the facesheets.

8. The composite sandwich of claim 1, wherein the carrier includes rigid foam.

9. The composite sandwich of claim 1, wherein the carrier is closed cell foam, and the core has a density of between approximately 6.9 and 12 pounds per cubic foot.

10. The composite sandwich of claim 1, wherein the composite sandwich is part of an aircraft structure.

11. A reinforced composite sandwich core formable into a curved shape, comprising:
a first plurality of pins comprising at least a first pin having a first end, a second pin comprising a second end, and a third pin comprising a third end, wherein the first end, the second end, and the third end are spaced apart and arranged in a first crossing pattern at the first node; are spaced apart at about the first end, second end, and third end; are substantially circumferentially spaced equally from each other at about the first end, second end, and third end; and wherein each pin of the first pin, the second pin, and the third pin overlaps at least one first other pin of the first pin, the second pin, and the third pin and is overlapped by at least one second other pin of the first pin, the second pin, and the third pin;
a second plurality of pins comprising at least a fourth pin having a fourth end, a fifth pin having a fifth end, and a sixth pin having a sixth end, wherein the fourth end, the fifth end, and the sixth end are spaced part and arranged in a second crossing pattern at the second node, and wherein the first plurality of pins and the second plurality of pins are arranged into a truss structure; are spaced apart at about the fourth end, fifth end, and sixth end; are substantially circumferentially spaced equally from each other at about the fourth end, fifth end, and sixth end;
and wherein each pin of the fourth pin, the fifth pin, and the sixth pin overlaps at least one third other pin of the fourth pin, the fifth pin, and the sixth pin and is overlapped by at least one fourth other pin of the fourth pin, the fifth pin, and the sixth pin; and
a flexible carrier for supporting the first plurality of pins and the second plurality of pins, wherein pins in the first plurality of pins and the second plurality of pins are spaced apart from and displaceable relative to each other within the carrier upon forming of the carrier into the curved shape.

12. The reinforced composite sandwich core of claim 11, wherein the first plurality of pins is radially distributed around the first node and wherein the second plurality of pins is radially distributed around the second node.

13. The reinforced composite sandwich core of claim 11, wherein:
the carrier includes a layer of uncured thermoset foam, and the pins are a thermoset prepreg.

14. The reinforced composite sandwich core of claim 11, wherein:
the carrier includes a foam layer, wherein the pins include medial portions held within the foam layer, and wherein distal portions of the pins extend outside of the foam layer.

15. The reinforced composite sandwich core of claim 14, wherein the distal portions are splayed and lie substantially flush along a face of the foam layer.

16. A method of fabricating a reinforced composite sandwich, comprising:
fabricating a core having a first surface and a second surface opposite the first surface, wherein fabricating includes:
inserting into a closed cell carrier foam a plurality of pins in groups to form a truss, wherein the plurality of pins further comprise first ends and second ends, and wherein the groups comprise subsets of three or more pins of the plurality of pins that are spaced apart and arranged in a crossing pattern at about the corresponding first ends, are substantially circumferentially spaced equally from each other at about the first ends, and wherein each pin of the three or more pins overlaps at least one first other pin of the three or more pins and is overlapped by at least one second other pin of the three or more pins; and
sealing porosity in the closed cell carrier foam created by insertion of the plurality of pins by applying a first plurality of layers of solid film adhesive on the first surface and a second plurality of layers of solid film adhesive on the second surface;
forming the core into a curved shape;
applying a first facesheet to the first surface and a second facesheet to the second surface such that the plurality of pins include medial portions extending between the first facesheet and the second facesheet and distal portions respectively extending generally parallel with and bonded to the first facesheet; and
curing the core, the first facesheet, and the second facesheet.

17. The method of claim 16, wherein arranging the plurality of pins includes inserting the plurality of pins into the closed cell carrier foam at differing angles.

18. The method of claim 16, wherein fabricating the core further comprises bending the first ends of the plurality of pins onto the first plurality of layers and the second ends of the plurality of pins onto the second plurality of layers.

19. The method of claim 18, wherein fabricating the core further comprises flaying the first ends and the second ends.

20. The method of claim 19, wherein fabricating the core further comprises sandwiching flayed ends of the plurality of pins between the first facesheet and the first plurality of layers, and between the second facesheet and the second plurality of layers, respectively.

21. The method of claim 16, wherein forming the core into a curved shape includes:

bending the closed cell carrier foam, and displacing the plurality of pins in each group relative to each other as the closed cell carrier foam is being bent.

* * * * *